(12) United States Patent
Segawa et al.

(10) Patent No.: US 10,063,838 B2
(45) Date of Patent: Aug. 28, 2018

(54) INFORMATION PROCESSOR, INFORMATION PROCESSING METHOD, AND COMPUTER PROGRAM

(71) Applicants: SONY CORPORATION, Tokyo (JP); Sony Computer Entertainment Inc., Tokyo (JP)

(72) Inventors: Hiroyuki Segawa, Tokyo (JP); Akio Ohba, Tokyo (JP); Tetsugo Inada, Tokyo (JP); Hirofumi Okamoto, Tokyo (JP); Atsushi Kimura, Tokyo (JP); Takashi Kohashi, Tokyo (JP); Takashi Itou, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 425 days.

(21) Appl. No.: 14/802,709

(22) Filed: Jul. 17, 2015

(65) Prior Publication Data
US 2016/0044297 A1 Feb. 11, 2016

(30) Foreign Application Priority Data
Aug. 11, 2014 (JP) ................................. 2014-163965

(51) Int. Cl.
*H04N 13/02* (2006.01)
*G06F 3/01* (2006.01)
(Continued)

(52) U.S. Cl.
CPC ......... *H04N 13/0239* (2013.01); *G06F 3/011* (2013.01); *G06F 3/0304* (2013.01);
(Continued)

(58) Field of Classification Search
CPC ........... H04N 13/0239; H04N 13/0022; H04N 13/0271; H04N 13/0264; H04N 13/0225;
(Continued)

(56) References Cited

U.S. PATENT DOCUMENTS

2011/0026808 A1* 2/2011 Kim ..................... G06T 7/50
382/154
2013/0342641 A1* 12/2013 Morioka ................ G03B 35/08
348/36

FOREIGN PATENT DOCUMENTS

WO 2007/050885 A2 5/2007

* cited by examiner

*Primary Examiner* — Jay Patel
*Assistant Examiner* — Salame Amr
(74) *Attorney, Agent, or Firm* — Matthew B. Dernier, Esq.

(57) ABSTRACT

An information processor includes: a similarity data generation portion generating similarity data that represents the calculated similarity to the image in the reference block in association with a position within the search range; a result evaluation portion detecting a position with a maximum similarity value for each piece of the similarity data and screening the detection result by making a given evaluation of the similarity; a depth image generation portion finding a parallax for each of the reference blocks using the detection result validated as a result of screening, calculating a position of a subject in a depth direction on a basis of the parallax, and generating a depth image by associating the position of the subject in the depth direction with an image plane; and an output information generation section performing given information processing on a basis of the subject position in a three-dimensional space using the depth image and outputting the result of information processing.

9 Claims, 18 Drawing Sheets

(51) Int. Cl.
  *G06T 1/20* (2006.01)
  *G06F 3/03* (2006.01)
  *G06T 7/593* (2017.01)
  *H04N 13/00* (2018.01)

(52) U.S. Cl.
  CPC ............... *G06T 1/20* (2013.01); *G06T 7/593* (2017.01); *G06T 2207/20016* (2013.01); *G06T 2207/20021* (2013.01); *H04N 2013/0081* (2013.01)

(58) Field of Classification Search
  CPC .......... H04N 2013/0085; G06F 3/0346; G06F 3/005; G06F 3/011; G06T 7/0051; G06T 7/2086; G06T 1/20; G06T 2200/04; G06T 2200/28; G06T 2207/10012; G06T 2207/10028
  USPC .......................................................... 348/47
  See application file for complete search history.

FIG. 18
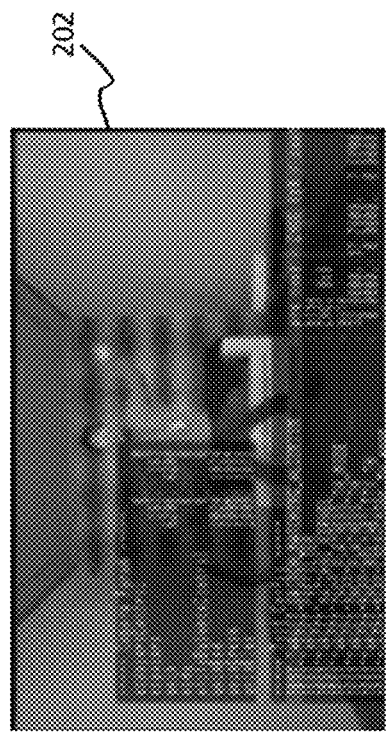
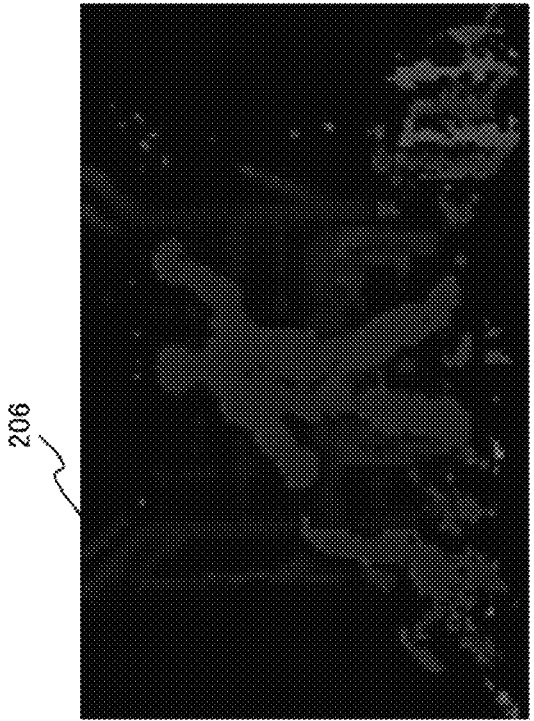
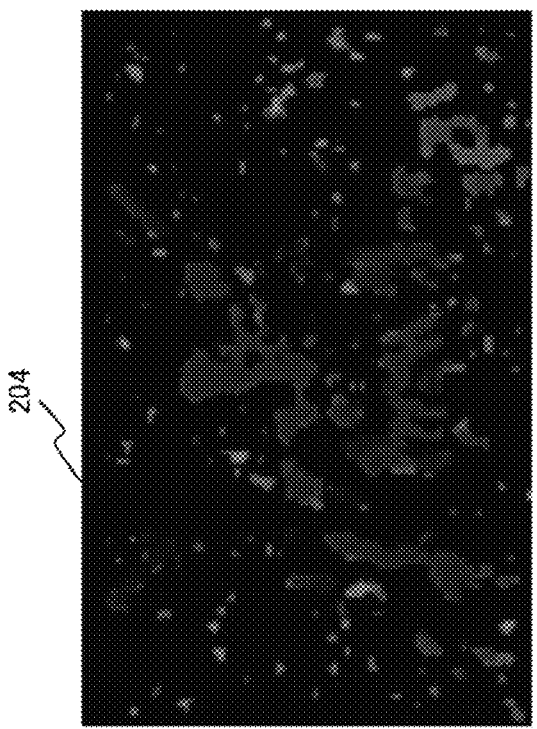

INFORMATION PROCESSOR, INFORMATION PROCESSING METHOD, AND COMPUTER PROGRAM

BACKGROUND

The present disclosure relates to an information processor that performs information processes using a shot image, an information processing method used by the information processor, and a computer program.

In recent years, it has become common practice that a camera is incorporated in a personal computer or game console for capturing images of a user for use in a variety of forms. For example, some technologies that are commercially available today such as television (TV) phone and video chat are designed to transmit user's images to other end in an as-is manner through the network. Other technologies recognize user's motions by image analysis and use such motions as input information for games and information processing (refer, for example, to WO 2007/050885 A2 Publication).

Further, it has become possible in recent years to provide a better sense of realism and image representation by detecting user's motions in a three-dimensional space including a depth direction with high accuracy. Among commercially available techniques adapted for detecting a position of a target in the depth direction are those using parallax between left and right images shot by a stereo camera and others adapted to analyze a reflection time of an emitted infrared beam or an infrared image.

SUMMARY

In technologies using a stereo camera, pictures of the same object are extracted from images shot by left and right cameras. Then, the amount of parallax between the pictures is identified to derive the subject position in the depth direction. At this time, if, depending, for example, on the brightness of the shooting space, the composition, and the shape of the subject, a wrong picture is associated or no picture is associated at all, error may find its way into position information, or an undefined area may occur, adversely affecting the accuracy of subsequent processes.

In light of the foregoing, it is desirable to provide a technology for deriving position information of a subject in a three-dimensional space with high accuracy irrespective of the shooting environment.

One mode of the present disclosure relates to an information processor. The information processor includes a similarity data generation portion, a result evaluation portion, a depth image generation portion, and an output information generation section. The similarity data generation portion treats, as a reference block, each of a plurality of areas obtained by dividing one of left and right shot images shot with stereo cameras adapted to shoot the same space from left and right viewpoints, sets up a search range in an other image for each of the reference blocks, and generates similarity data that represents the calculated similarity to the image in the reference block in association with a position within the search range. The result evaluation portion detects a position with a maximum similarity value for each piece of the similarity data and screens the detection result by making a given evaluation of the similarity. The depth image generation portion finds a parallax for each of the reference blocks using the detection result validated as a result of screening, calculates a position of a subject in a depth direction on a basis of the parallax, and generates a depth image by associating the position of the subject in the depth direction with an image plane. The output information generation section performs given information processing on a basis of the subject position in a three-dimensional space using the depth image and outputs the result of information processing.

Another mode of the present disclosure relates to an information processing method. The information processing method includes treating, as a reference block, each of a plurality of areas obtained by dividing one of left and right shot images shot with stereo cameras adapted to shoot same space from left and right viewpoints, setting up a search range in an other image for each of the reference blocks, generating similarity data that represents the calculated similarity to the image in the reference block in association with a position within the search range, and storing the similarity data in a memory. The information processing method further includes reading each piece of the similarity data from the memory, detecting a position with a maximum similarity value, and screening the detection result by making a given evaluation of the similarity. The information processing method still further includes finding a parallax for each of the reference blocks using the detection result validated as a result of screening, calculating a position of a subject in a depth direction on a basis of the parallax, and generating a depth image by associating the position of the subject in the depth direction with an image plane. The information processing method still further includes performing given information processing on a basis of the subject position in a three-dimensional space using the depth image and outputting the result of information processing to an external device.

Another mode of the present disclosure relates to a computer program for a computer. The computer program includes treating, as a reference block, each of a plurality of areas obtained by dividing one of left and right shot images shot with stereo cameras adapted to shoot same space from left and right viewpoints, setting up a search range in an other image for each of the reference blocks, and generating similarity data that represents the calculated similarity to the image in the reference block in association with a position within the search range. The computer program further includes detecting a position with a maximum similarity value for each piece of the similarity data and screening the detection result by making a given evaluation of the similarity. The computer program still further includes finding a parallax for each of the reference blocks using the detection result validated as a result of screening, calculating a position of a subject in a depth direction on a basis of the parallax, and generating a depth image by associating the position of the subject in the depth direction with an image plane. The computer program still further includes performing given information processing on a basis of the subject position in a three-dimensional space using the depth image and outputting the result of information processing.

It should be noted that any combinations of the above components and any conversions of expressions of the present disclosure between method, device, system, computer program, recording medium storing a computer program, and so on are also effective as modes of the present disclosure.

The present disclosure provides a subject position information identification technology that is highly robust to changes in shooting environment.

BRIEF DESCRIPTION OF THE DRAWINGS

FIG. 18 is a diagram that compares a depth image obtained in the present embodiment against that obtained in related art.

DETAILED DESCRIPTION OF THE PREFERRED EMBODIMENT

Figure 1:
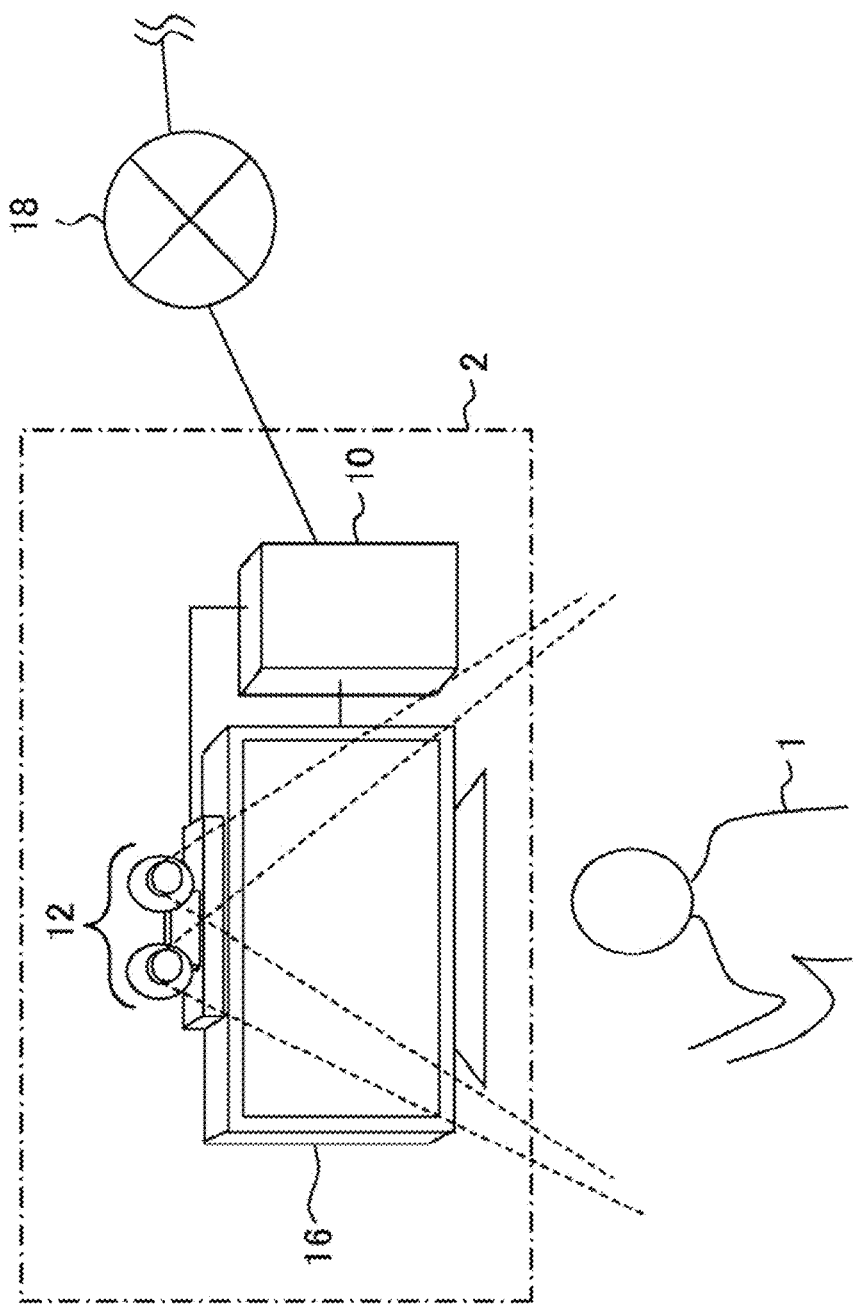
FIG. 1 is a diagram illustrating a configuration example of an information processing system to which the present embodiment is applicable.

FIG. 1 illustrates a configuration example of an information processing system to which the present embodiment is applicable. An information processing system 2 includes an imaging device 12, an information processor 10, and a display device 16. The imaging device 12 has two cameras adapted to capture a target such as a user 1. The information processor 10 handles information processing in response to a request of the user on the basis of a shot image. The display device 16 outputs image data obtained as a result of processes performed by the information processor 10. Further, we assume that the information processor 10 can connect to a network 18 such as the Internet.

The information processor 10, the imaging device 12, the display device 16, and the network 18 may be connected together by cables. Alternatively, they may be connected together wirelessly, for example, through wireless local area network (LAN). Any two of the imaging device 12, the information processor 10, and the display device 16, or all thereof may be combined integrally. Alternatively, it may be not necessary to dispose the imaging device 12 on top of the display device 16. Further, there are no limitations to the number and types of main targets to be shot such as a user 1. Further, in the present embodiment, position information of not only main targets but also whatever is in the fields of view of the cameras such as floors, walls, and furniture can be obtained without specific distinction. These will be hereinafter collectively referred to as "subjects."

The imaging device 12 has two digital video cameras that are arranged, one on a left and another on a right with a known space therebetween. Each of the digital video cameras includes a charge coupled device (CCD), complementary metal oxide semiconductor (CMOS), or other imaging element. Each of the digital video cameras captures a subject existing in the same space from the right or left position at a given frame rate. A frame pair obtained by shooting as described above will be hereinafter referred to as a "stereo image."

The information processor 10 detects a position of a subject in a three-dimensional space including an image plane and a depth direction from the cameras. A detection result is used for processes performed at subsequent stages where the subject's position and motion are used as input information. For example, the detection result is used to implement augmented reality (AR) that draws a virtual object flying over a shoulder or palm of the user 1 in the shot image. Alternatively, a motion of the user 1 may be tracked so as to reflect the motion in the game image or convert the motion into command input for information processing. Therefore, the application purpose thereof is not limited.

The display device 16 displays the result of the process performed by the information processor 10 as an image as needed. The display device 16 may be a display adapted to output an image or a television set having a speaker adapted to output sounds. The display device 16 may be, for example, a liquid crystal television, plasma television, or PC display. The details of processes eventually performed by the information processor 10 and the image to be displayed are not specifically limited by the application purpose thereof as described above. Therefore, a description will be given below with primary emphasis on position detection of a target handled by the information processor 10.

Figure 2:
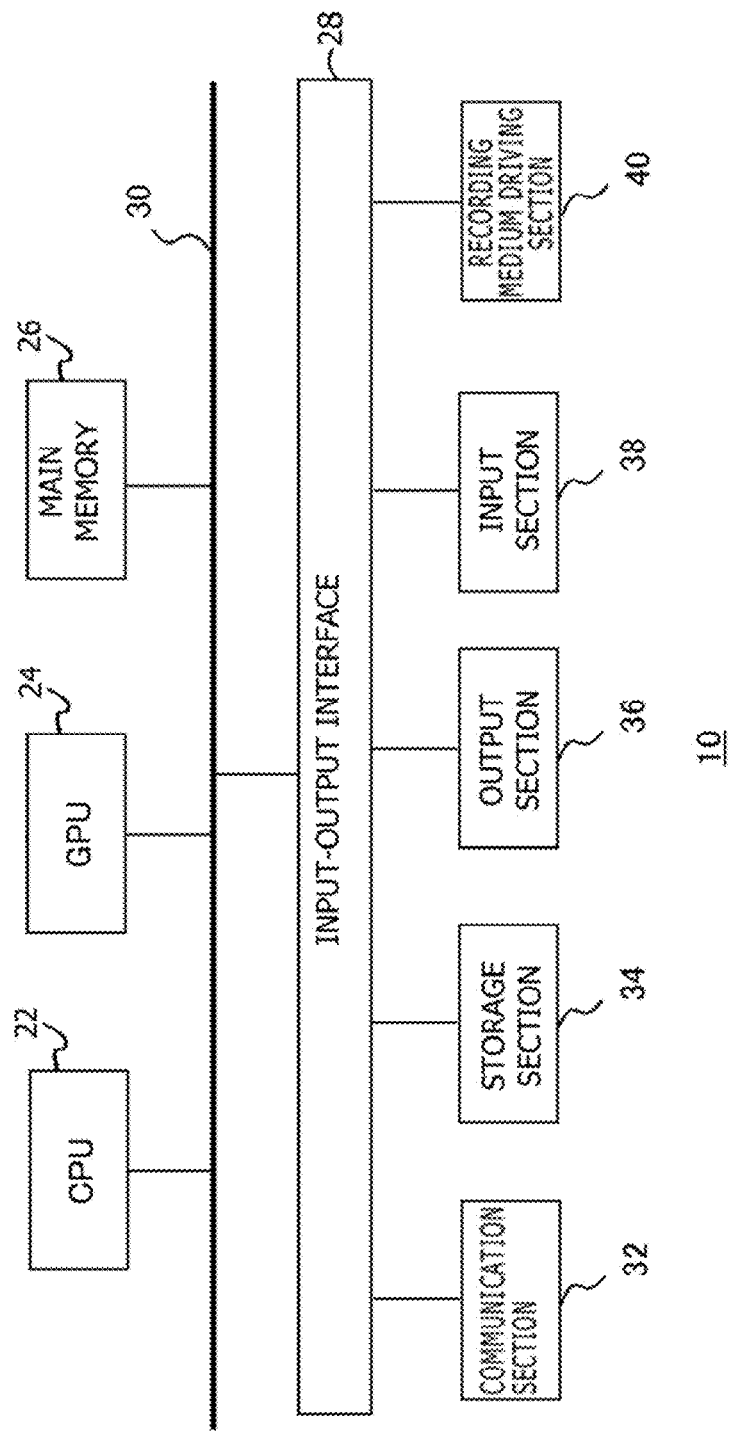
FIG. 2 is a diagram illustrating an internal circuit configuration of an information processor in the present embodiment.

FIG. 2 illustrates an internal circuit configuration of the information processor 10. The information processor 10 includes a central processing unit (CPU) 22, a graphics processing unit (GPU) 24, and a main memory 26. The CPU 22 performs processes associated with internal components of the information processor 10 and controls an exchange of signals on the basis of programs such as operating system and application programs. The GPU 24 handles image processing. The main memory 26 has a random access memory (RAM) and stores programs and data required for processing.

These sections are connected to each other via a bus 30. An input-output interface 28 is also connected to the bus 30. A communication section 32, a storage section 34, an output section 36, an input section 38, and a recording medium driving section 40 are connected to the input-output interface 28. The communication section 32 includes a peripheral interface such as universal serial bus (USB) and IEEE1394 and wired or wireless LAN network interface for connecting the network 18. The storage section 34 includes a hard disk drive, a nonvolatile memory, and so on. The output section 36 outputs data to output devices such as the display device 16 and the speaker. The input section 38 receives data inputs from input devices such as keyboard, mouse, microphone, and the imaging device 12. The recording medium driving section 40 drives a removable recording medium such as magnetic disc, optical disc, or semiconductor memory.

The CPU 22 controls the whole information processor 10 by executing the operating system stored in the storage section 34. The CPU 22 also executes various programs that are either read from the removable recording medium and loaded into the main memory 26 or downloaded from the server or the like via the communication section 32. The GPU 24 has a geometry engine function and a rendering processor function, performing drawing in accordance with a drawing instruction from the CPU 22 and storing a display image in a frame buffer which is not shown. Then, the display image stored in the frame buffer is converted into a video signal and output, for example, to the output section 36.

Figure 3:
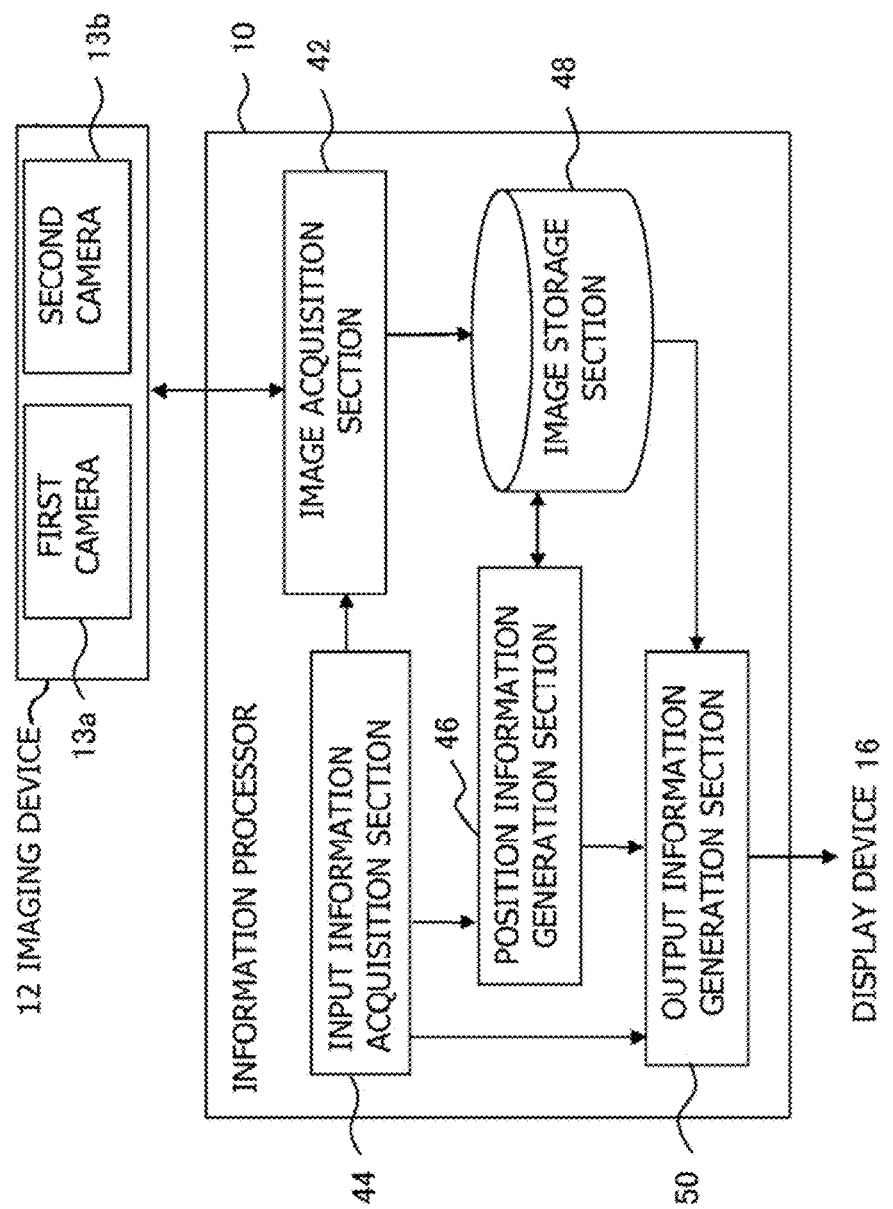
FIG. 3 is a diagram illustrating configurations of functional blocks of an imaging device and the information processor in the present embodiment.

FIG. 3 illustrates configurations of the functional blocks of the imaging device 12 and the information processor 10. Each of functional blocks illustrated in FIG. 3 and FIG. 8 described later can be implemented in terms of hardware by the CPU, the GPU, the RAM illustrated in FIG. 2, and other processors and in terms of software by programs offering data input, data retention, image analysis, drawing and other functions loaded from recording medium or the like. Therefore, it will be understood by those skilled in the art that these functional blocks can be implemented in various forms including hardware alone, software alone, and a combination thereof, and are not limited to any one of them.

The imaging device 12 includes first and second cameras 13a and 13b. Each of the cameras captures a subject from the left or right position at a given frame rate. The left and right positions are spaced by a known width. The stereo image obtained by shooting is transmitted to the information processor 10 whenever necessary by an ordinary technique in response to a request from the information processor 10. The information processor 10 includes an image acquisition section 42, an input information acquisition section 44, a position information generation section 46, an output information generation section 50, and an image storage section 48. The image acquisition section 42 acquires a stereo image from the imaging device 12. The input information acquisition section 44 acquires an instruction input from the user. The position information generation section 46 generates subject position information on the basis of shot images. The output information generation section 50 generates output information by performing necessary processes on the basis of the subject position. The image storage section 48 stores stereo images supplied from the imaging device 12 and intermediate data or the like generated by the position information generation section 46.

The input information acquisition section 44 accepts an instruction input from the user and transmits an appropriate processing request signal to other functional blocks. The input information acquisition section 44 is implemented by coordination between an ordinary input device such as button, keyboard, mouse, trackball, or touch panel and the CPU adapted to interpret the details of operation performed on the input device and generate a processing request signal.

The image acquisition section 42 acquires image data such as stereo image from the imaging device 12 in response to a request from the input information acquisition section 44 and stores the image data in the image storage section 48. Images to be acquired by the image acquisition section 42 may be various in type in accordance with the process performed by the information processor 10 at a subsequent stage or information to be output. For example, only an image shot by the first camera 13a may be acquired at the same frame rate as at the time of shooting, and stereo images shot by the first camera 13a and the second camera 13b at a lower rate may be acquired. That is, the frame rates at which an image shot by the first camera 13a and that shot by the second camera 13b are acquired may be specified independently of each other.

The position information generation section 46 identifies the position of a subject in a three-dimensional space through stereo matching on the basis of stereo image data stored in the image storage section 48. More specifically, the pictures of the same subject are extracted from the stereo images, and the positional deviation between the two pictures is determined as parallax. Then, the distance from the cameras to the subject (position of the subject in the depth direction) is derived on the basis of the principle of triangulation. A common technique used to calculate the position in the depth direction for stereo matching in general can be used. In the present embodiment, a block or a small area of one of the images is compared against a block of the same size of the other image for block matching, a process adapted to identify highly similar blocks. A detailed description will be given later.

The position information generation section 46 stores the identified position information of the subject in the image storage section 48 as a depth image. A depth image is data representing, on an image plane, the position of a subject in the depth direction within the fields of view of the cameras as pixel values of the subject. The output information generation section 50 performs a process such as drawing appropriate to the purpose of use on the shot image read from the image storage section 48 on the basis of the depth image generated by the position information generation section 46. The process performed here is not specifically limited as described above and may be changed as appropriate in response to a user instruction accepted by the input information acquisition section 44. Image data obtained as a result of the process is output and displayed on the display device 16. Alternatively, image data may be transmitted to other device via the network 18.

Figure 4:
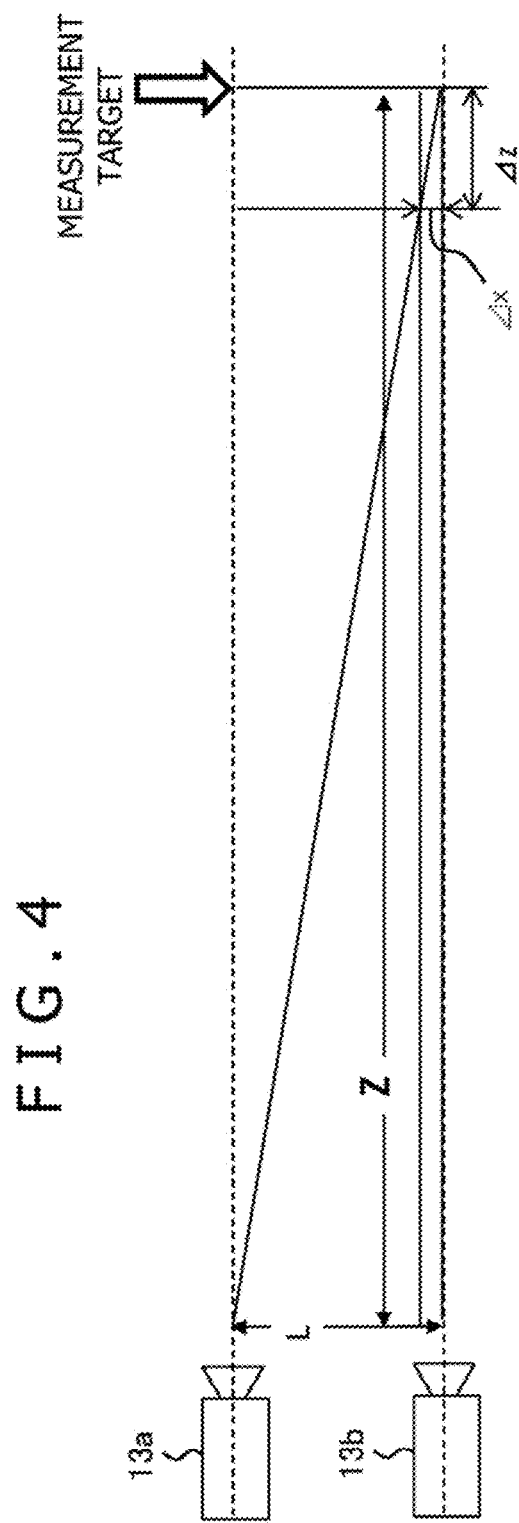
FIG. 4 is a diagram for describing a relationship between stereo image parallax and the position of a subject in the depth direction.

A description will be given next of basic stereo matching technique performed by the position information generation section 46. FIG. 4 is a diagram for describing a relationship between stereo image parallax and a position of a subject in a depth direction. The first and second cameras 13a and 13b are disposed in such a manner as to have parallel optical axes that are at a distance L from each other. We assume that the subject is located at a position indicated by an arrow at the far right end. In contrast with these cameras, this position is at a distance Z in the depth direction.

A width $\Delta x$ in the real space represented by a pixel of an image shot by each of the cameras is proportional to the distance Z and expressed as follows:

$$\Delta x = Z \times w / W$$

where W is a horizontal pixel count of the camera, w is a horizontal range of view field of the real space when the distance Z is unit length and is determined by a view angle. The same target captured by the cameras that are at the distance L from each other has approximately a following parallax D in pixels in that image:

$$D = L/\Delta x = L \times (W/w) \times (1/Z) = C/Z$$

where C is a value determined by the camera and its setting and can be considered a constant during operation.

Figure 5:
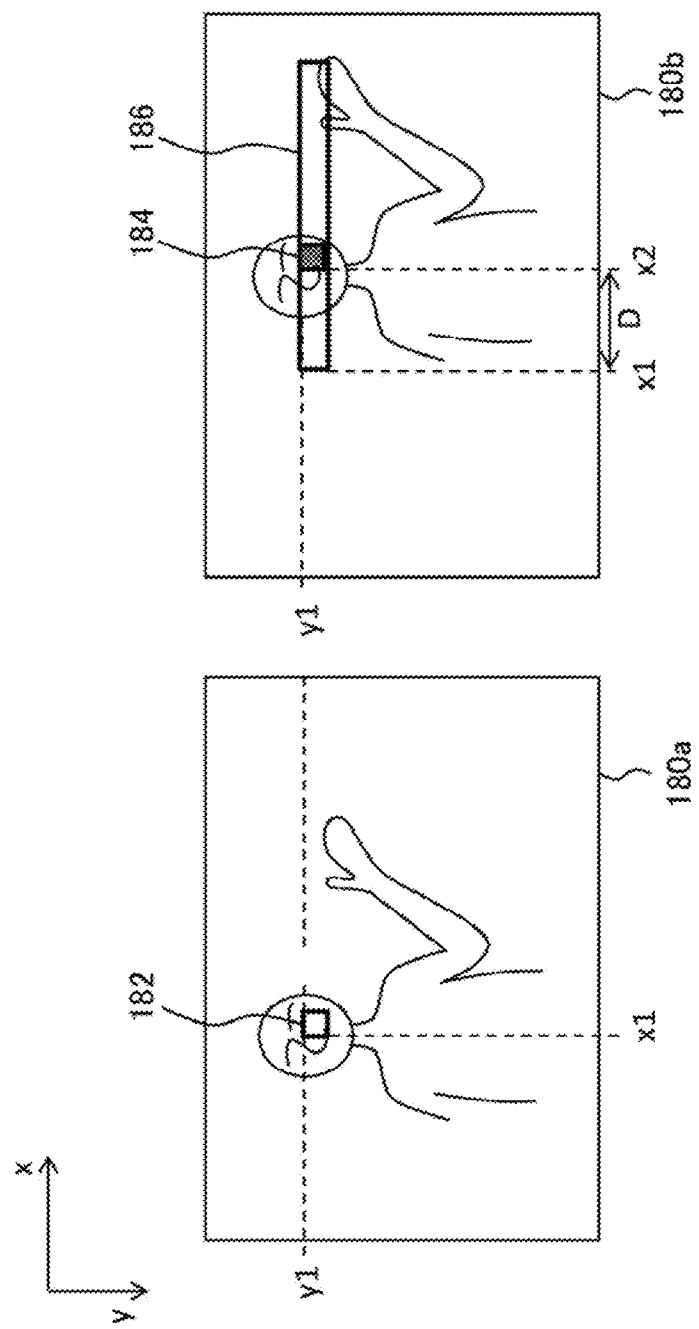
FIG. 5 is a diagram for describing a block matching technique in the present embodiment.

The distance Z in the depth direction can be found from the above relational formula by finding the positional deviation between the pictures of the same subject appearing in the stereo images as the parallax D. The stereo images are subjected to block matching to identify the correspondence between the subject's pictures in the two images so as to find the parallax D. FIG. 5 is a diagram for describing a block matching technique. First, of right and left images 180*a* and 180*b*, stereo images, for example, a block of a given size of the right image 180*a* is used as a reference block 182. Here, the reference block is, for example, four by four (4×4) pixels or eight by eight (8×8) pixels in size.

Next, a block 184 of the left image 180*b* is identified which is highly similar to a reference block 182 of the right image 180*a*. Therefore, a search range 186 is set up in the left image 180*b*. The search range 186 has the same vertical length as the reference block 182 and a given horizontal length. A block frame of the same size as the reference block 182 is moved horizontally within the search range 186. At the same time, similarity between the area enclosed by the block frame (hereinafter referred to as a "target block") and the reference block 182 is calculated. The block frame is moved one pixel or a given plurality of pixels at a time. As a result, the change in similarity is obtained with reference to the horizontal axis of the search range 186.

It should be noted that if the optical axes of the two cameras are parallel, and that if there is no deviation between horizontal lines that represent the same position in the stereo images, only horizontal deviation attributable to parallax occurs in the two images. Therefore, the search range 186 is set up at the same vertical position as the reference block 182 in the images. Letting the horizontal and vertical directions of the images be denoted respectively as the x and y axes as illustrated in FIG. 5, the position coordinates of the upper sides of the search range 186 and the reference block 182 are the same or y1. On the other hand, the picture in the left image 180*b* is located slightly more to the right than the picture of the same subject in the right image 180*a* due to parallax. As a result, it is efficient to set up the search range to the right of and starting from horizontal position x1 of the reference block 182.

If a reference block is set up in the left image, the search range is set up to the left of and starting from the position of the reference block which is opposite to the above. Theoretically, the target block of all those in the search range 186 that provides the highest similarity is the block 184 corresponding to the reference block 182. Then, the difference between a horizontal position x1 of the reference block 182 in the right image 180*a* and a horizontal position x2 of the corresponding block 184 in the left image 180*b* is the parallax D.

Several techniques have been proposed to calculate similarity. Among those proposed are sum of squared difference (SSD), sum of absolute difference (SAD), normalized cross-correlation (NCC), and zero-mean normalized cross-correlation (ZNCC). All the techniques are basically designed to compare reference and target blocks on the basis of pixel values of corresponding pixels. A description will be given below of an example using ZNCC. However, the present embodiment is not limited thereto. ZNCC is a technique designed to minimize the impact of the change in image brightness on similarity by subtracting the mean luminance of the block from the luminance value of each pixel first and then correlating the two. More specifically, similarity R is defined by the formula shown below.

$$R = \frac{\sum_{j=0}^{H-1}\sum_{i=0}^{W-1}(\text{Tar}(i,j) - \overline{\text{Tar}}) \cdot (\text{Ref}(i,j) - \overline{\text{Ref}})}{\sqrt{\sum_{j=0}^{H-1}\sum_{i=0}^{W-1}(\text{Tar}(i,j) - \overline{\text{Tar}})^2 \cdot \sum_{j=0}^{H-1}\sum_{i=0}^{W-1}(\text{Ref}(i,j) - \overline{\text{Ref}})^2}}$$

Tar(i,j) and Ref(i,j) are the luminance values of the pixels at position coordinates (i,j) of target and reference blocks, respectively, when the top left corner is the origin (0,0). Letting the vertical and horizontal numbers of pixels of a block be denoted by H and W, respectively, $0 \leq i \leq W-1$, and $0 \leq j \leq H-1$. Further, Tar(upper bar) and Ref(upper bar) are mean luminance values of the target and reference blocks, respectively, and can be expressed as follows.

$$\overline{\text{Tar}} = \frac{1}{WH}\sum_{j=0}^{H-1}\sum_{i=0}^{W-1}\text{Tar}(i,j)$$

$$\overline{\text{Ref}} = \frac{1}{WH}\sum_{j=0}^{H-1}\sum_{i=0}^{W-1}\text{Ref}(i,j)$$

Calculation of the similarity R using the above formulas reduces the number of calculation passes, namely, mean luminance value calculation and similarity R calculation, from two to one, thus ensuring high efficiency.

$$R = \frac{WH\sum_{j=0}^{H-1}\sum_{i=0}^{W-1}\text{Tar}(i,j)\cdot\text{Ref}(i,j) - \sum_{j=0}^{H-1}\sum_{i=0}^{W-1}\text{Tar}(i,j)\cdot\sum_{j=0}^{H-1}\sum_{i=0}^{W-1}\text{Ref}(i,j)}{\sqrt{\left(WH\sum_{j=0}^{H-1}\sum_{i=0}^{W-1}\text{Tar}(i,j)^2 - \left(\sum_{j=0}^{H-1}\sum_{i=0}^{W-1}\text{Tar}(i,j)\right)^2\right)\cdot\left(WH\sum_{j=0}^{H-1}\sum_{i=0}^{W-1}\text{Ref}(i,j)^2 - \left(\sum_{j=0}^{H-1}\sum_{i=0}^{W-1}\text{Ref}(i,j)\right)^2\right)}}$$

Figure 6:
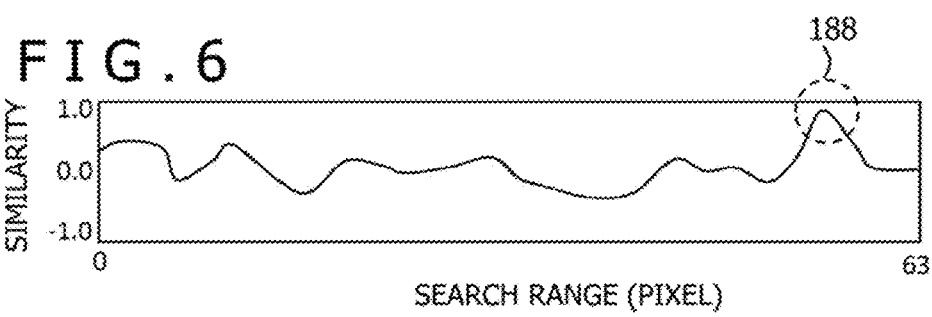
FIG. 6 is a diagram illustrating an example of changes in similarity obtained in the present embodiment.

The change in the similarity R with respect to a horizontal position can be obtained by repeatedly calculating the similarity R while at the same time moving the target block within the search range as described above. FIG. 6 illustrates an example of the change in the similarity R obtained in this manner. The horizontal axis represents the search range which is 64 pixels long from 0 to 63 in the example of FIG. 6. The vertical axis represents the similarity R which varies in the range from −1.0 to 1.0. In this example of the similarity R, the target block located where the maximum value of 188 is obtained corresponds to the reference block.

The present inventor conceived of the likelihood that the following problem may occur in block matching described above. That is, it is likely that the similarity between normally non-corresponding blocks may accidentally increase due, for example, to noise included in signals from imaging elements. Such a circumstance tends to occur particularly during shooting in a dark environment. Further, if similar textures are provided successively in the horizontal direction, or if there are only a few feature points in the reference block, the search range as a whole ends up having high similarity, resulting in absence of a clear peak. This possibly leads to extraction of a wrong maximum similarity value and faulty matching. The higher the probability of occurrence of this circumstance, the more likely it is that noise may find its way into parallax information, and, by extension, position information, and an undefined area may expand.

Figure 7:
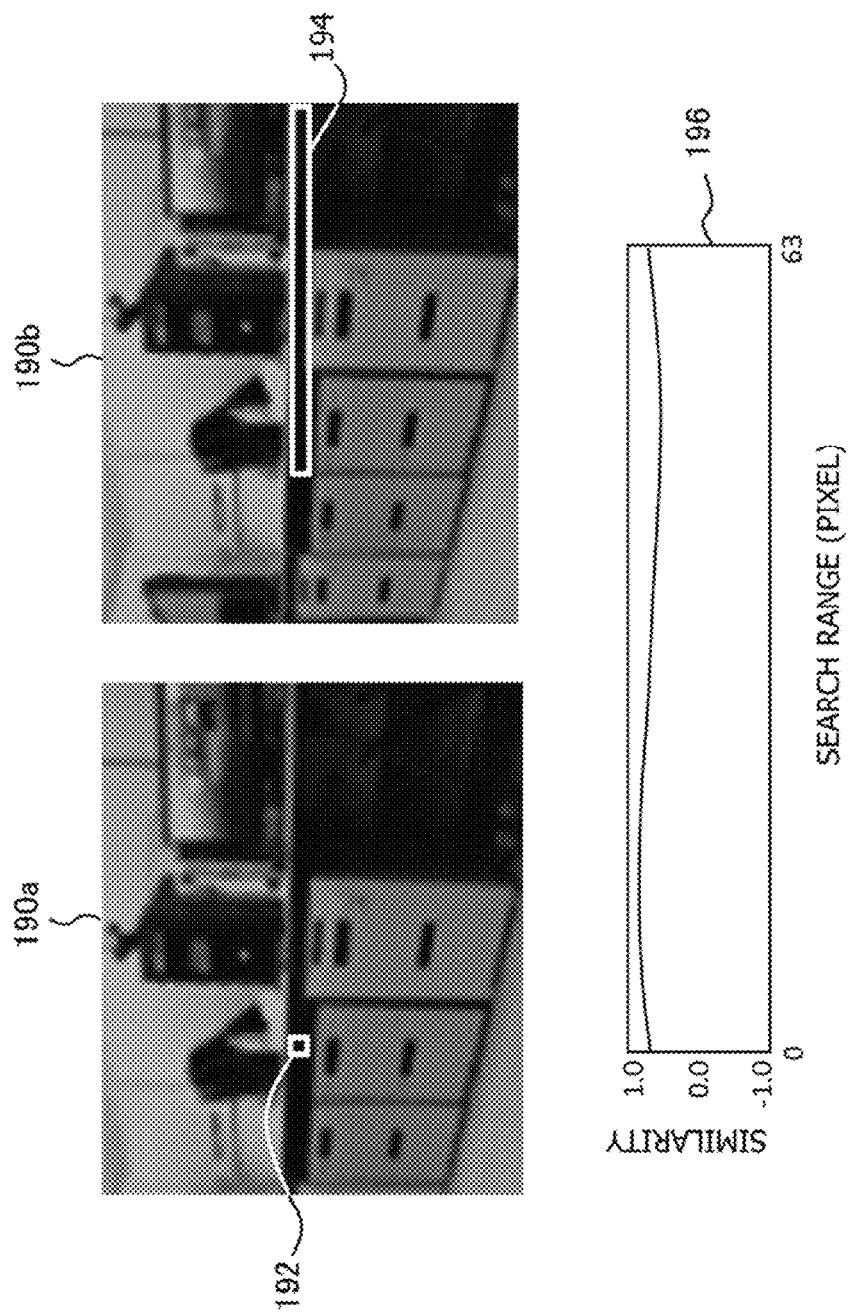
FIG. 7 is a diagram illustrating a case in which no clear peaks appear in the similarity obtained in the present embodiment.

FIG. 7 illustrates a case in which no clear peaks appear in similarity. Of the horizontally shot stereo images of a desk and objects placed on top of and under the desk in a room, a reference block 192 set up in a right image 190a shows a picture of one of the lateral faces of the desk's top board. We assume that a search range 194 is set up in a left image 190b to suit the reference block 192. The lateral face of the desk's top board runs in the horizontal direction. Therefore, any portion within the search range 194 is similar to the reference block 192. As a result, high similarity is obtained across the search range 194 as shown by similarity 196. In such a case, it is highly likely that a wrong position with the maximum similarity value may be detected or that no maximum values may be detected at all.

Such a phenomenon can also take place not only with an object having a horizontally long and narrow picture as with the lateral face of a desk but also with an image including a picture that is both vertically and horizontally large and whose surface lacks distinctive features such as monochromatic object having a wide plane parallel to the imaging surfaces of the cameras. Further, if a plane extends in the depth direction as does a ceiling or floor, the luminance distribution of an image often has a gradation pattern that horizontally remains constant and vertically gradually changes. In such a case, no clear peaks can be obtained by making a search in the horizontal direction, often resulting in error as in the example of FIG. 7.

For this reason, the present embodiment corrects or evaluates the similarity itself from a variety of aspects in relation to the search range, thus detecting accidental peaks and maximum values that are unreliable as described above, excluding them from the matching result, and minimizing error in position information in the depth direction. On the other hand, the present embodiment ensures that the similarity is maximal at the inherent position corresponding to the parallax, and that this maximum similarity value is not excluded from the matching result, thus minimizing the size of an area with an undefined position in the depth direction.

Figure 8:
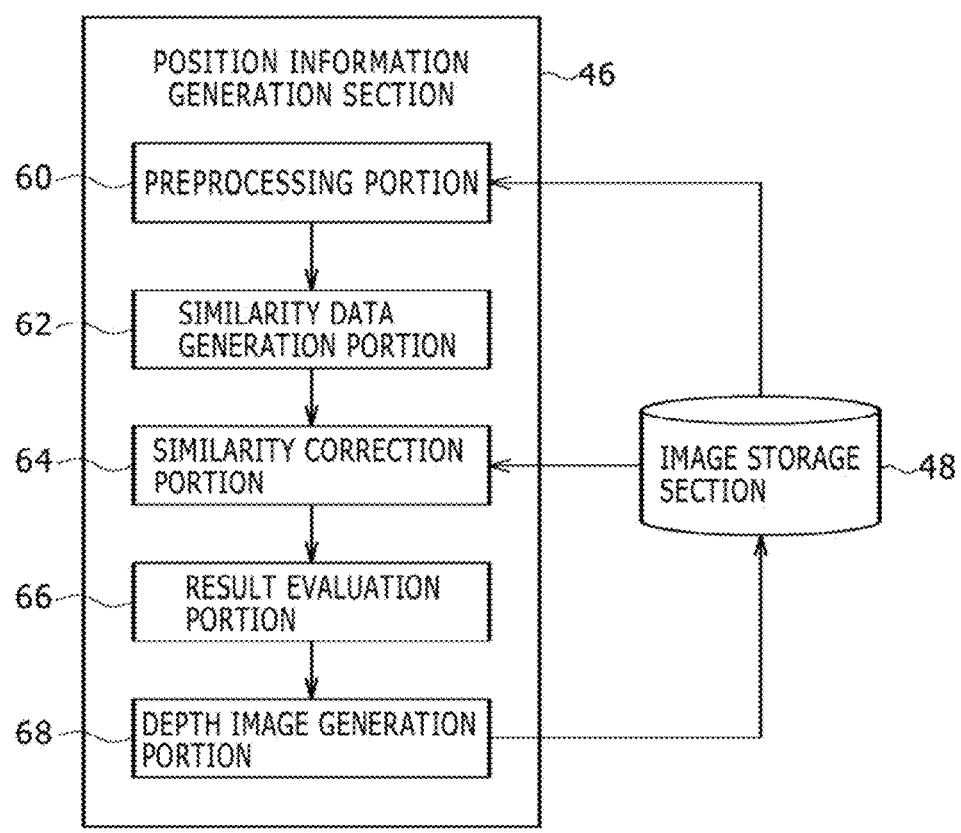
FIG. 8 is a diagram illustrating in more detail a configuration of functional blocks of a position information generation section in the present embodiment.

FIG. 8 illustrates in more detail a configuration of functional blocks of the position information generation section 46 of the information processor 10. The position information generation section 46 basically acquires a pair of pieces of stereo image data from the image storage section 48, identifies the position of the subject in the depth direction, generates a depth image, and stores the image in the image storage section 48. The position information generation section 46 includes a preprocessing portion 60, a similarity data generation portion 62, a similarity correction portion 64, a result evaluation portion 66, and a depth image generation portion 68. The preprocessing portion 60 performs preprocessing on stereo images. The similarity data generation portion 62 generates similarity data using the above block matching. The similarity correction portion 64 corrects similarity data. The result evaluation portion 66 screens a matching result. The depth image generation portion 68 generates a depth image using the matching result.

The preprocessing portion 60 subjects stereo images to given processes that are required for block matching. First, if the image data obtained from the imaging device 12 is an RGB image, the preprocessing portion 60 converts it into a YCbCr image, thus generating a Y image representing the luminance. Further, in block matching described above, a horizontal search range is set up at the same vertical position as the reference block assuming that there is no difference between the left and right cameras other than their horizontal position. In reality, however, discrepancy may exist between the horizontal plane of the real space and the horizontal direction of a shot image by small inclination of camera or the like. By extension, it is possible that the horizontal axes of the stereo images may not coincide. Therefore, the preprocessing portion 60 rearranges the epipolar lines of the stereo images on the same horizontal line. The preprocessing portion 60 performs distortion correction, noise reduction, and other processes in addition to the above.

In stereo matching based on the principle of triangulation, common techniques can be used for these processes. Therefore, a detailed description thereof is omitted here. The similarity data generation portion 62 calculates similarity using the preprocessed stereo images through the above techniques. That is, the similarity data generation portion 62 treats, as a reference block, each of a plurality of areas obtained by dividing one of the left and right shot images, determines a search range in the other image for each of the reference blocks, and calculates similarity while at the same time moving the target block. As a result, a similarity sequence is calculated for each of the positions within the search range. The similarity data generation portion 62 generates this sequence as a unit of similarity data and stores it in the image storage section 48. The changes in similarity illustrated in FIGS. 6 and 7 are representations of the one unit of similarity data as graphs.

The similarity correction portion 64 smoothes the similarity data acquired as described above at least in the direction of time or space. This contributes to reduced likelihood of a normally non-corresponding block receiving high similarity due, for example, to noise in images and makes it easier to detect peaks at positions where high similarity should be obtained. The result evaluation portion 66 not only detects the target block position where the maximum value can be obtained from smoothed similarity data but also screens the detection result on the basis of several evaluation criteria. More specifically, the extent to which the maximum value stands out in similarity data (variation as compared to the previous and succeeding positions) is found as "sharpness," and detection results whose sharpness is equal to a threshold or less are invalidated. The reason for this is that similarity data with low sharpness can be considered unreliable with no clear peaks as described with reference to FIG. 7.

Further, despite having the maximum similarity value, a detection result is invalidated if the absolute value thereof is equal to a threshold or less. This is intended to exclude, from the matching result, those cases in which a relative maximum value is detected although it cannot be said that any of the positions is a corresponding one due to low similarity across the search range for some kind of reason. Further, if the similarity correction portion 64 smoothes similarity data in the direction of space, and if the similarity of the detected position in the similarity data prior to smoothing is equal to a threshold or less, the detection result is invalidated. This is intended to exclude, from the matching result, those cases in which similarity is high at a wrong position because information of other area has erroneously found its way into the matching result as a result of smoothing in the direction of space.

The result evaluation portion 66 notifies, to the depth image generation portion 68, information of the unexcluded, and therefore, remaining position of all the positions of the target block having the maximum similarity value as a matching result. Similarity data is generated for each reference block as described above. Therefore, a matching result is obtained for each reference block. The depth image generation portion 68 finds the position of the subject, represented by a reference block, in the depth direction by treating the position deviation between each reference block and its corresponding block in the image as parallax. Doing so for all the reference blocks generates a depth image having each reference block as a pixel. The generated depth image data is stored in the image storage section 48. It should be noted that if image coordinate conversion such as rearrangement of epipolar lines is performed by the preprocessing portion 60, a corresponding positional relationship is established between the depth and shot images on the image plane by reverse conversion of the depth image.

Figure 9:
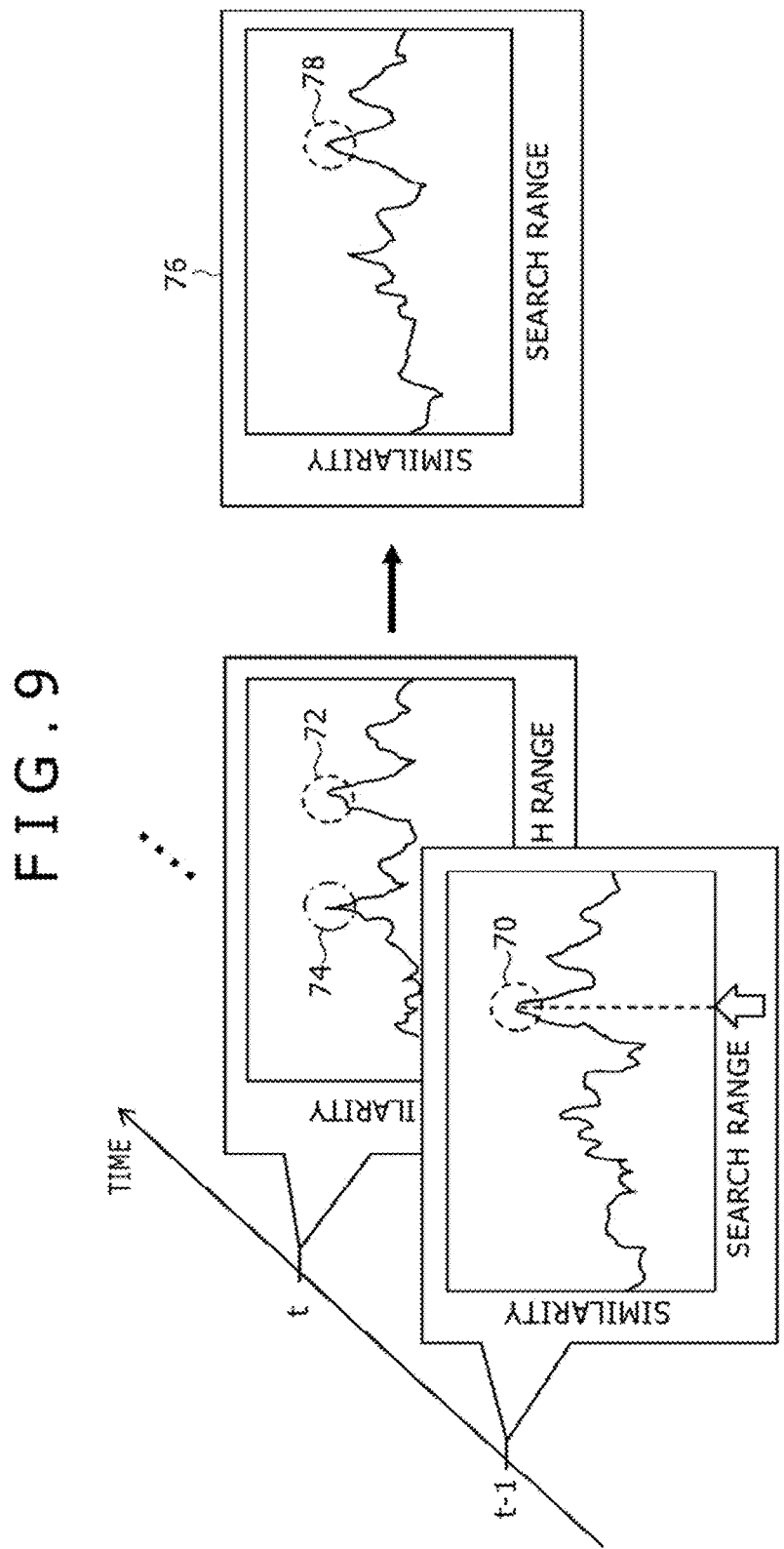
FIG. 9 is a diagram for describing smoothing of similarity data in the direction of time performed by a similarity correction portion in the present embodiment.

FIG. 9 is a diagram for describing smoothing of similarity data in the direction of time performed by the similarity correction portion 64 in the present embodiment. As described above, the information processor 10 acquires stereo image data from the imaging device 12 at a given frame rate. Therefore, the similarity data generation portion 62 repeats the generation of similarity data for each reference block at each time step determined by the frame rate using new shot stereo images. FIG. 9 illustrates a graph of similarity data generated for a reference block located at the same position in stereo images shot at time steps t−1 and t, with t−1 being previous to t.

In the example of FIG. 9, a clear maximum value of 70 is obtained from the similarity data at time t−1. Therefore, the position indicated by an arrow in the search range is output as a matching result, and the position in the depth direction is calculated on the basis of the matching result. On the other hand, the similarity data at time t shows a local maximum value 72 at the same position as the maximum value 70 that appears at time t−1 and a local maximum value 74 at a different position. In consideration of the similarity data at time t−1, the local maximum value 72 at time t is a true value. On the other hand, the local maximum value 74 is probably a false peak resulting from accidental high similarity attributable to noise in the original image.

If the local maximum value 74 is detected as a matching result, position information in the depth direction changes instantaneously because of the change from the matching result at time t−1, thus resulting in noise. Similarity data is smoothed to prevent the emergence of the false local maximum value 74 from adversely affecting position information. More specifically, similarity $R_{(x,y,t)in}(S)$ before smoothing of the reference block at position coordinates (x,y) at the target time step and similarity $R_{(x,y,t-1)out}(s)$ after smoothing at the previous time step are compared at the same position s of the search range as shown in the following formulas. Then, when the difference therebetween is smaller than a threshold th1, the similarity $R_{(x,y,t)in}(s)$ is corrected with the difference using a feedback factor r (%), thus finding similarity $R_{(x,y,t)out}(s)$ after smoothing.

$$a = \begin{cases} 0 (\text{if } |R_{(x,y,t-1)out}(s) - R_{(x,y,t)in}(s)| < th1) \\ r (\text{if } |R_{(x,y,t-1)out}(s) - R_{(x,y,t)in}(s)| \geq th1) \end{cases}$$

$$R_{(x,y,t)out}(s) = R_{(x,y,t)in}(s) + \frac{a}{100}(R_{(x,y,t-1)out}(s) - R_{(x,y,t)in}(s))$$

A false local maximum value caused by image noise or other factor has only a small chance of continuously appearing at the same position unlike a true local maximum value. Therefore, smoothing in the direction of time as described above minimizes such a false local maximum value. As a result, similarity data 76 with only a true maximum value 78 remaining is obtained as shown in FIG. 9. It should be understood by those skilled in the art that the formulas used for smoothing in the direction of time are not limited to the above, and that various other modification examples can be employed such as using similarity data at more time steps than the above two.

Figure 10:
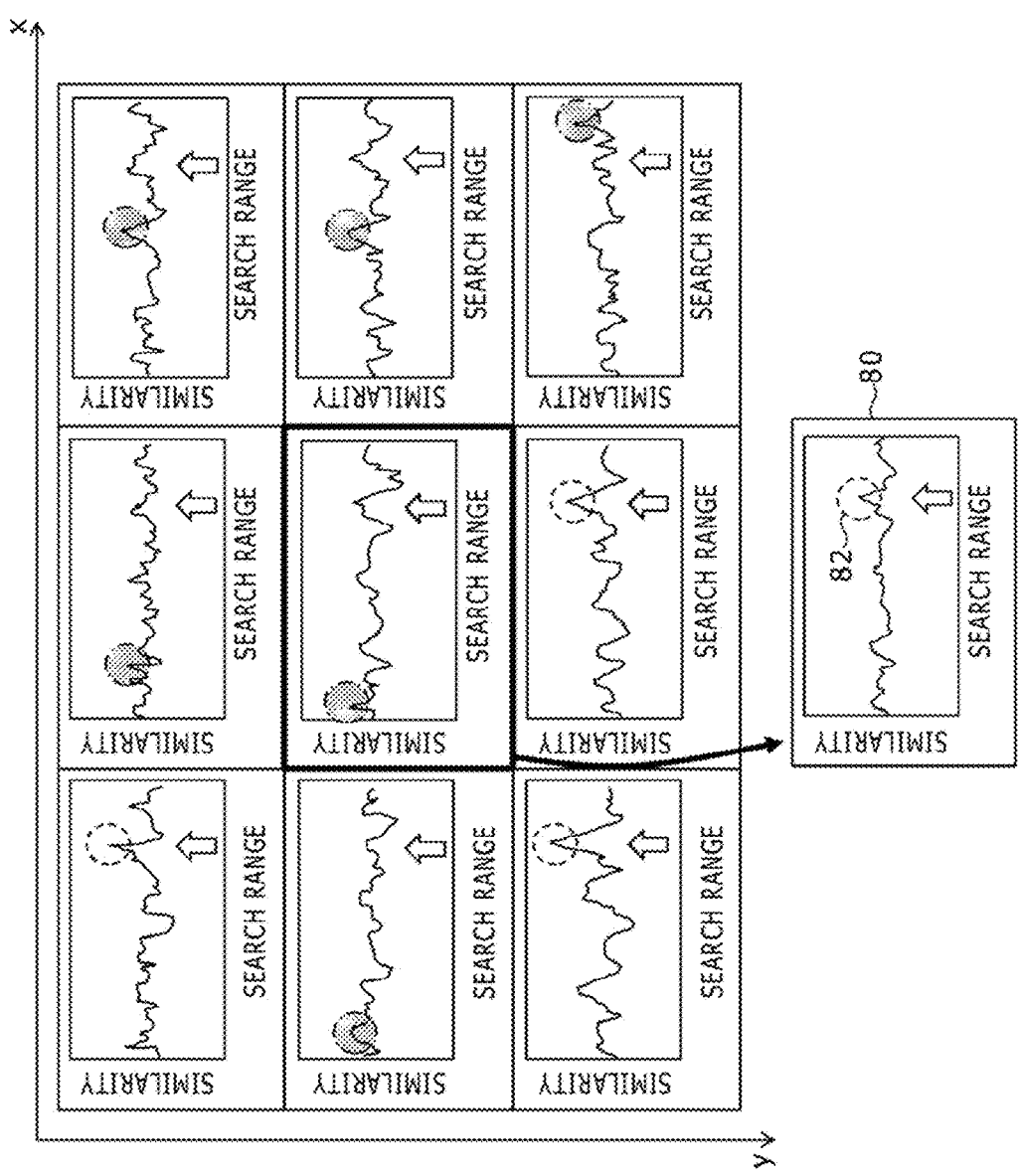
FIG. 10 is a diagram for describing smoothing of similarity data in the direction of space performed by the similarity correction portion in the present embodiment.

FIG. 10 is a diagram for describing smoothing of similarity data in the direction of space performed by the similarity correction portion 64. As described above, the similarity data generation portion 62 acquires similarity data for each of a plurality of reference blocks obtained by dividing one of stereo images at a certain time step. FIG. 10 illustrates, of these blocks, a graph of similarity data obtained for three by three (3×3) reference blocks that are horizontally (x axis) and vertically (y axis) adjacent to each other.

An outlined arrow shown within the frame of each piece of similarity data in FIG. 10 indicates the position where the maximum similarity value should be normally located. If the position of the object in the depth direction appearing in the area occupied by the three by three reference blocks is the same, the maximum value should be obtained at the same position as shown in FIG. 10. Some of the pieces of similarity data actually obtained, however, have their maximum values, enclosed by circles, not necessarily located at positions indicated by the outlined arrows.

This is caused by the presence of similar textures at different positions within the same search range or accidentally high similarity obtained due to image noise. In FIG. 10, false maximum values caused by these reasons are enclosed by shaded circles. These false maximum values often occur locally and are unlikely to occur at the same position in the surrounding reference blocks. On the other hand, at least a local maximum value is highly likely to occur at the position where such a value should be normally obtained in all the pieces of similarity data.

For this reason, similarity data is smoothed in the direction of space, thus making it more likely that a maximum value will appear at the true position. More specifically, the mean value of the similarity $R_{(x+i,y+j,t)in}(s)$ (where i and j are integers which satisfy—$[n/2] \leq i$ and $j \leq [n/2]$, respectively) before smoothing of the n by n (n is an odd number) reference blocks centered around the reference block at target position coordinates (x,y) at time step t is denoted by the similarity $R_{(x,y,t)out}(s)$ after smoothing. Here, s is the position coordinates of the search range.

$$R_{(x,y,t)out}(s) = \frac{1}{n^2} \sum_{j=-[n/2]}^{[n/2]} \sum_{i=-[n/2]}^{[n/2]} R_{(x+i,y+j,t)in}(s)$$

Taking the mean value including similarity obtained for the surrounding areas in this manner minimizes maximum values that occur accidentally and locally, thus highlighting the position where a local maximum value, if not the maximum value, is obtained and where the maximum value should be located. In the example of FIG. 10, n=3, and similarity data 80 is obtained which shows a true maximum value of 82 by averaging similarity data of nine units including the original similarity data for the target reference block shown by a bold frame and similarity data for the surrounding eight reference blocks.

The position in the depth direction is obtained for each reference block. Therefore, downsizing the reference block, for example, to 4 by 4 or 8 by 8 pixels provides higher resolution of the depth image, and by extension, higher spatial resolution of subsequent information processing. On the other hand, the more locally an image is processed, the more likely it is that feature points appearing on the surface of an object move out of the minute area in question, making it difficult to obtain true similarity. Smoothing similarity data in the direction of space as described above ensures that features of an object on the surface are recognized from a broad view. As a result, it is possible to provide improved matching accuracy while at the same time maintaining the resolution with which the position in the depth direction is obtained. It should be noted that the formula used for smoothing in the direction of space is not limited to the above.

Further, the larger the number of reference blocks to be averaged, the easier it is to obtain a true corresponding position because the surface features can be recognized in a broad view. On the other hand, it becomes more likely that other subject located at a different position in the depth direction may be included in the area to be averaged. Instead, matching accuracy may decline. Therefore, the optimal number is determined in advance, for example, experimentally. Alternatively, the number may be determined adaptively, for example, on the basis of frequency characteristic of the shot image. Still alternatively, as will be described later, similarity data obtained by smoothing and original similarity data may be compared to evaluate the reliability of the maximum value obtained from smoothing for purposes of screening.

Figure 11:
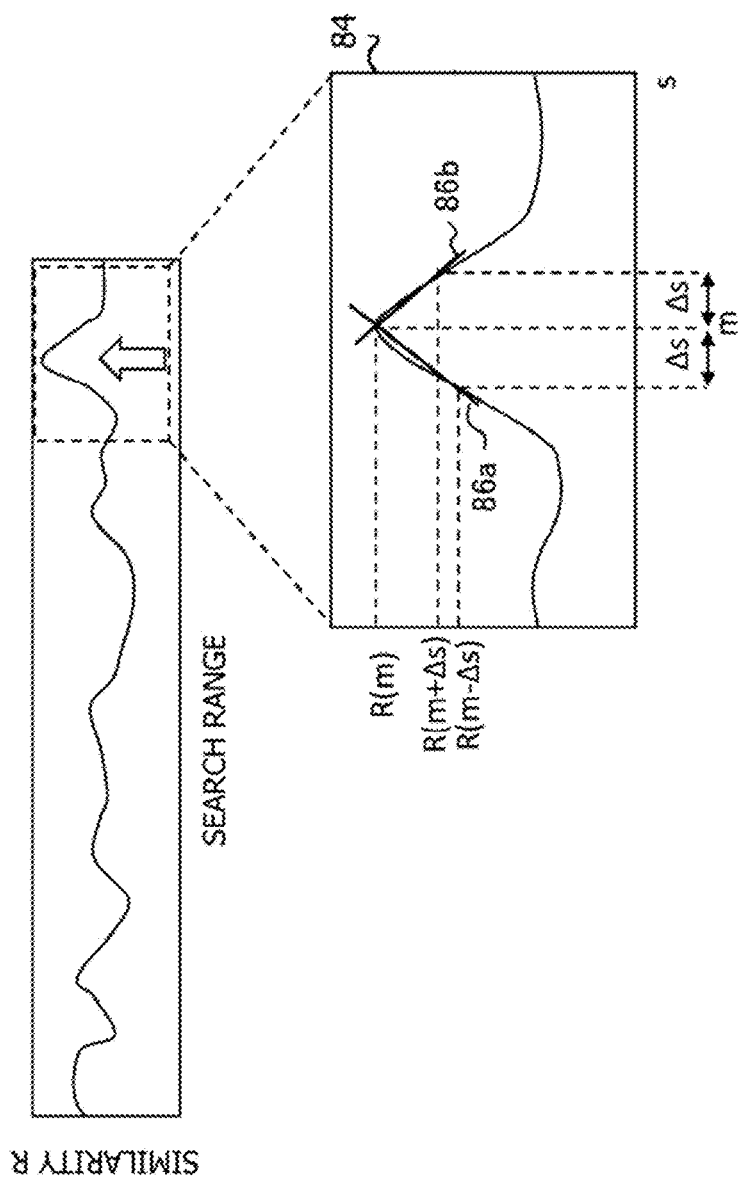
FIG. 11 is a diagram for describing a matching result screening process performed by a result evaluation portion which uses the sharpness of similarity data as an evaluation criterion in the present embodiment.

FIG. 11 is a diagram for describing a matching result screening process performed by the result evaluation portion 66 using the sharpness of similarity data as an evaluation criterion. Similarity data obtained for a certain reference block is shown at the top of FIG. 11. This data may be one that has been smoothed in the direction of time or space or one generated by the similarity data generation portion 62 if such a process is omitted. In any case, the result evaluation portion 66 detects a maximum value at the position indicated by an outlined arrow. Next, sharpness S of the portion where the maximum value of the similarity data is obtained is calculated by the following formula.

$$S = \min\left\{\frac{|R(m) - R(m - \Delta s)|}{\Delta s}, \frac{|R(m) - R(m + \Delta s)|}{\Delta s}\right\}$$

The sharpness S in the above formula is defined by the smaller of the two slopes, each connecting a maximum value R(m) of similarity data and one of similarities R(m−Δs) and R(m+Δs) that are at a given distance Δs respectively backward and forward from a position m that gives the maximum value. In the example of FIG. 11, the smaller of the slopes of two straight lines 86a and 86b shown in an enlarged view 84 of the area near the maximum value is denoted by the sharpness S. Then, if the sharpness S is equal to a given threshold th2 or less, the detection result thereof is invalidated.

This excludes unreliable detection results from the matching result when there is no clear peak in the similarity as illustrated in the example of FIG. 7, and by extension, contributes to reduced error included in position information in the depth direction. It should be noted that the formula for defining the sharpness is not limited to the above, and that a differential graph of similarity data as a whole, for example, may be prepared. Further, if the sharpness is equal to the threshold th2 or less, the local maximum point with the second highest similarity may be extracted to determine the sharpness in the same manner so that if the sharpness is greater than the threshold th2, the target block position that gives that local maximum value is used as a matching result.

Further, the result evaluation portion 66 checks the detected maximum similarity value itself against the threshold. That is, even if the sharpness is greater than the threshold th2, the detection result is invalidated when the maximum similarity value is equal to the threshold or less. This prevents a maximum similarity value from being used as a matching result when similarity is low as a whole for some kind of reason. It should be noted, however, that the reliability of similarity is different from the beginning depending on intrinsic characteristics of a subject such as the density of feature points on the subject surface. Therefore, it is desirable to classify the cases depending on the characteristics and proceed with comparison against the threshold to suit each case.

Figure 12:
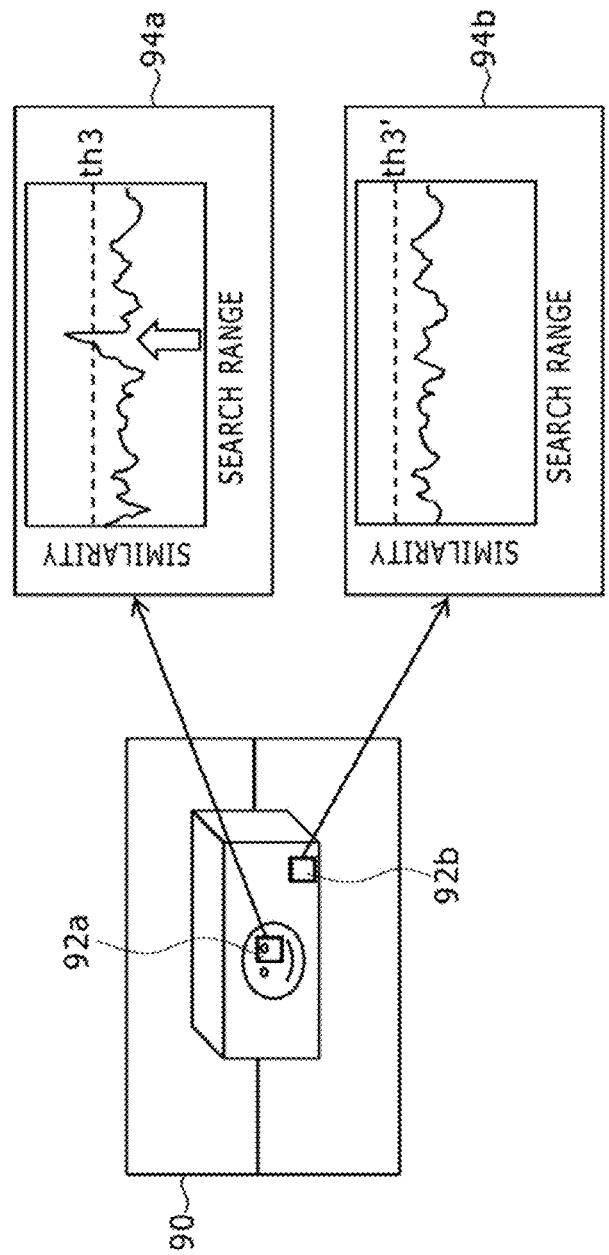
FIG. 12 is a diagram for describing a matching result screening process performed by the result evaluation portion which uses the maximum similarity value as an evaluation criterion in the present embodiment.

FIG. 12 is a diagram for describing a matching result screening process performed by the result evaluation portion 66 using the maximum similarity value as an evaluation criterion. In FIG. 12, we assume that similarity data 94a and 94b is obtained respectively for reference blocks 92a and 92b in an image 90, one of the stereo images. It should be noted that the similarity data 94a and 94b is data has been subjected to smoothing in the direction of time or space if such a process is performed.

As illustrated in FIG. 12, the reference block 92a includes part of a drawing of a face on the surface of a box, a subject, and the reference block 92b is a filled area on the surface of the box. In an area with a clear feature point such as the reference block 92a, a maximum similarity value tends to appear at the position of a truly similar target block as shown by an outlined arrow in the similarity data 94a. In an area with no clear feature points such as the reference block 92b, on the other hand, similarity tends to be high as a whole, resulting in an unreliable maximum value as in the similarity data 94b. Therefore, the threshold is changed in accordance with the features of the object surface. In the case of an area with no clear feature points, the validity of a detection result is determined on the basis of more rigorous evaluation. As a criterion for evaluating the features of such an object, the present embodiment switches between thresholds depending on the standard deviation of the luminance of the reference block. A standard deviation Std(Ref) of the luminance of the reference block can be defined as follows.

$$\text{Std(Ref)} = \sqrt{\frac{1}{WH}\sum_{j=0}^{H-1}\sum_{i=0}^{W-1} \text{Ref}(i, j)^2 - \left(\frac{1}{WH}\sum_{j=0}^{H-1}\sum_{i=0}^{W-1} \text{Ref}(i, j)\right)^2}$$

The above definition formula is obtained by dividing, by (WH)², the second of the two summation terms in the denominator of the calculation formula of the similarity R described above. That is, the standard deviation Std(Ref) can be simultaneously found when the similarity R is found. This can be used to provide improved processing efficiency. Then, if the standard deviation Std(Ref) of luminance is larger than the given threshold, this reference block is determined as a feature point area that includes a sufficient number of feature points. If the standard deviation Std(Ref) of luminance is equal to the given threshold or less, this reference block is determined as a non-feature point area that does not include a sufficient number of feature points.

According to the above principle, the similarity obtained for a feature point area is highly reliable. Therefore, the threshold for invalidating the detection result concerned is reduced, thus making the most of the detection result. The similarity obtained for a non-feature point area is not highly reliable. Therefore, the threshold for invalidating the detection result concerned is increased, thus excluding values other than the noticeably large one from a matching result. In the example of FIG. 12, if the reference block 92a is determined as a feature point area, and the reference block 92b as a non-feature point area, a threshold th3' specified for the similarity data 94b for the latter is set larger than a threshold th3 specified for the similarity data 94a for the former.

As a result, in this example, the maximum value detection result at the position indicated by an outlined arrow in the similarity data 94a is validated, and the maximum value detection result in the similarity data 94b is invalidated. In this manner, it is possible to keep only highly reliable detection results in consideration of the surface features of the object and the maximum similarity value at the same time. This provides a smaller number of areas whose position is undefined while at the same time contributing to reduced error included in position information in the depth direction.

Still further, the result evaluation portion 66 verifies and screens the possibility that false maximum values may have been obtained by smoothing similarity data in the direction of space. As illustrated in FIG. 10, similarity data obtained for a reference block is averaged together with data obtained for the surrounding reference blocks, thus making it more likely that a peak that seems the most reliable will appear. However, if the picture of an object located at a different position in the depth direction is included in a surrounding reference block to be averaged, there is a mixture of similarity data having maximum values at different positions as data to be averaged. As a result, there is a likelihood that, as a result of averaging, the normal maximum value may be kept small, and that another maximum value may appear at a different position. For this reason, the occurrence of such a circumstance is detected on the basis of similarity prior to smoothing.

Figure 13:
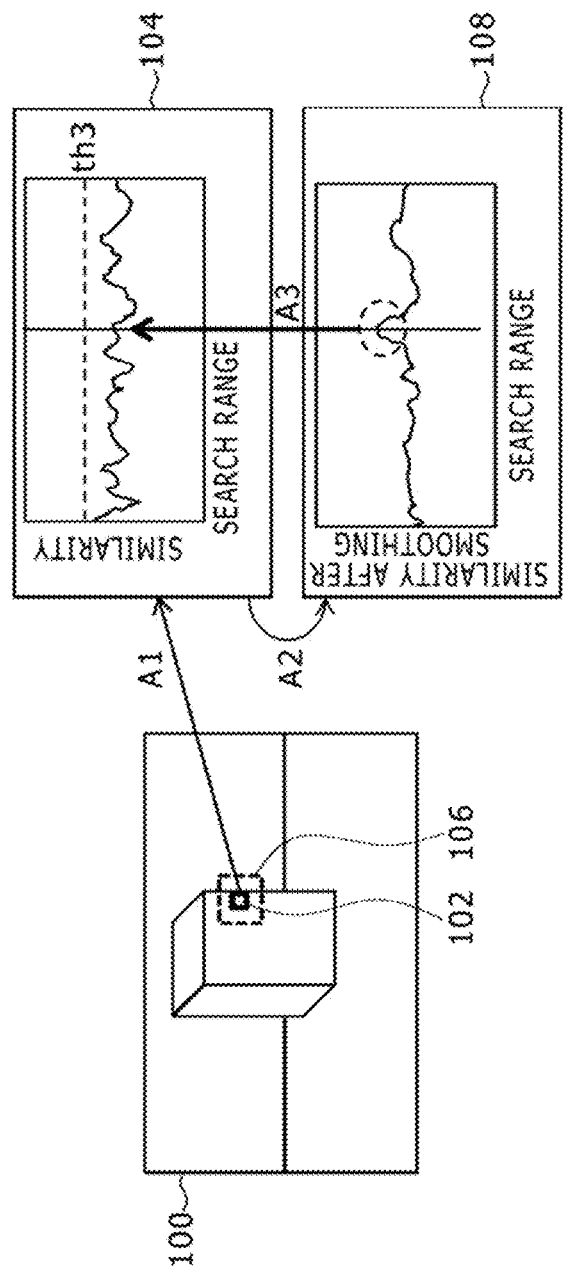
FIG. 13 is a diagram for describing a matching result screening process performed by the result evaluation portion according to the comparison of similarity in the direction of space before and after smoothing in the present embodiment.

FIG. 13 is a diagram for describing a matching result screening process performed by the result evaluation portion 66 according to the comparison of similarity in the direction of space before and after smoothing. In FIG. 13, we assume that a similarity data 104 is obtained for a reference block 102 in an image 100, one of the stereo images (arrow A1). This data is averaged together with similarity data in an area 106 that includes a given number of surrounding reference blocks, thus generating similarity data 108 after smoothing (arrow A2).

Although, normally, the position where the maximum value is obtained in this similarity data 108 after smoothing is determined as a matching result, the original similarity data 104 is referenced once, thus verifying similarity at the same position (arrow A3). In the case of the example illustrated, no significantly large similarity value appears in the original similarity data 104 at the position where the maximum value is obtained in the similarity data 108 after smoothing. That is, the normal purpose of smoothing which is to determine the maximum value position as a clear peak is not served.

In the example of FIG. 13, the reference block 102 shows the front face of a box, a subject. In contrast, the area 106 to be averaged includes a wall area in the back. In such a case, position information of other object such as the wall is included as a result of averaging, possibly resulting in a false peak. For this reason, a threshold th4 is provided for the original similarity at the position where the maximum value is obtained that has been detected in the similarity data 108 after smoothing. Then, the detection result is invalidated if the similarity at the position where the maximum similarity value should normally be obtained is equal to the threshold th4 or less.

This minimizes the possibility that error may occur instead as a result of smoothing in the direction of space, thus, by extension, reducing the size of an area whose position is undefined while at the same time keeping error included in position information in the depth direction to a minimum. It should be noted that although, in FIGS. 12 and 13, the similarity graph is checked against a threshold, it is actually only necessary to compare the maximum detected similarity value or the similarity value at the same position as before smoothing against a threshold.

Figure 14:
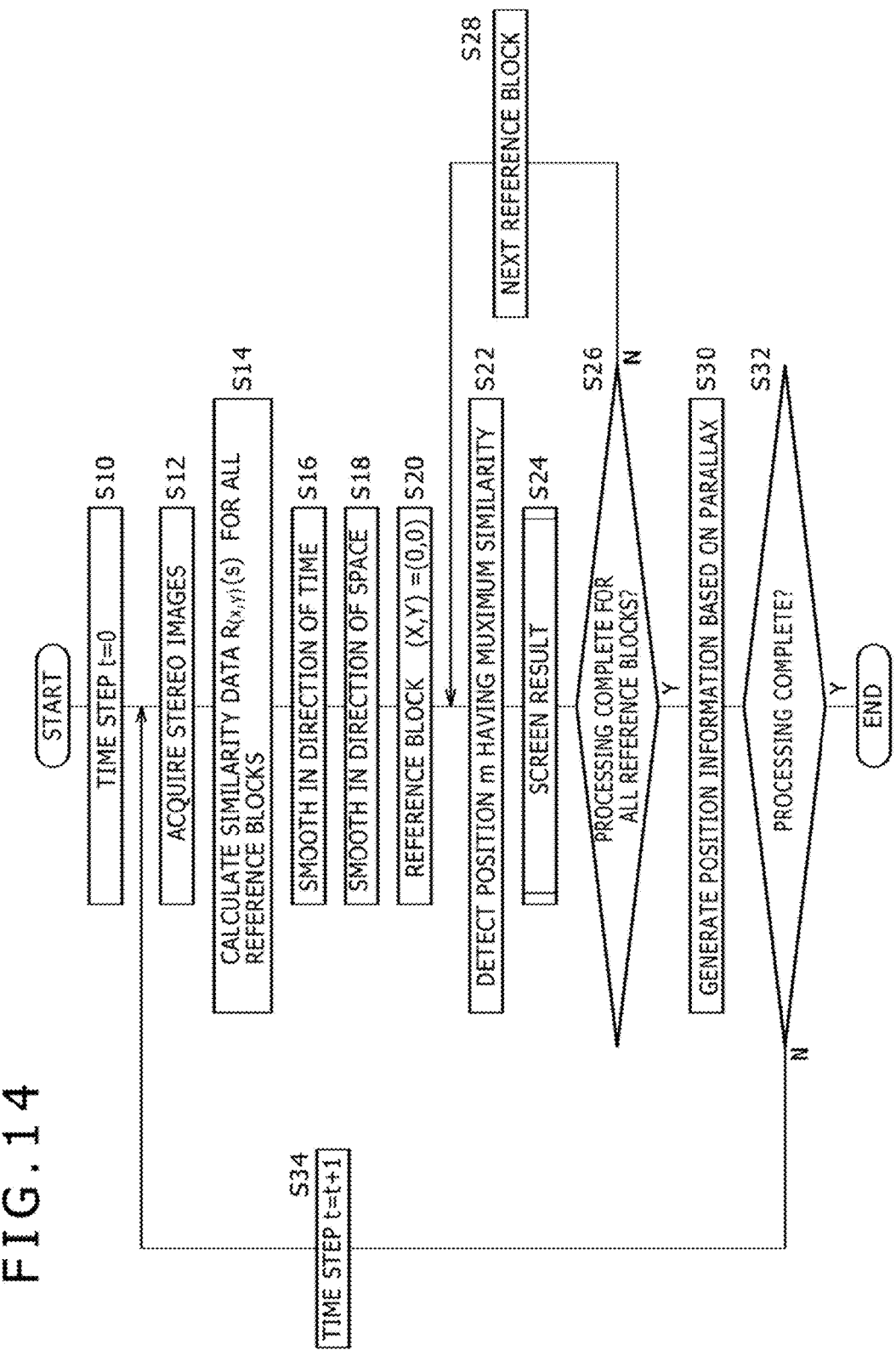
FIG. 14 is a flowchart illustrating processing steps for the position information generation section of the information processor to generate position information of a subject through matching of stereo images.

A description will be given next of the operation of the information processor 10 that can be implemented by the above configuration. FIG. 14 is a flowchart illustrating processing steps for the position information generation section 46 of the information processor 10 to generate position information of a subject through matching of stereo images. Here, the time steps at which shot stereo images are obtained are represented as t=0, 1, 2, and so on. First, the preprocessing portion 60 reads stereo image data shot at the first time step t=0 from the image storage section 48 (S10 and S12). Then, the preprocessing portion 60 proceeds with preprocessing such as conversion of each image into a YCbCr image, noise removal, and rearrangement of epipolar lines. The subsequent processes are performed using the Y image that represents the luminance.

Next, the similarity data generation portion 62 generates a two-dimensional sequence of reference blocks by spatially dividing one of the stereo images. Then, the similarity data generation portion 62 sets up a search range in the other image for each of the reference blocks and calculates the similarity, thus calculating similarity data $R_{(x,y)}(s)$ for all the reference blocks (S14). Here, (x,y) is the position coordinates of the reference block on the image plane, and s is the position in the search range. The calculated similarity data is stored once in the image storage section 48 in association with the position coordinates of the corresponding reference block.

Next, the similarity correction portion 64 reads each piece of the similarity data $R_{(x,y)}(s)$ from the image storage section 48 and smoothes the data both in the direction of time and space (S16 and S18). For smoothing in the direction of time, the similarity correction portion 64 reads, from the image storage section 48, the similarity data of the reference block at the same position after smoothing at the previous time step and performs smoothing on the basis of comparison against this data. At time step t=0, smoothing in the direction of time is omitted. For smoothing in the direction of space, the similarity correction portion 64 reads similarity data of the surrounding reference blocks before smoothing at the same time step and performs averaging. Similarity data after smoothing is used for smoothing in the direction of time in the subsequent time steps. Therefore, this data is stored in the image storage section 48 in association with the position coordinates of the reference block.

Next, the result evaluation portion 66 evaluates the similarity of each reference block after smoothing. More specifically, the maximum similarity value of the corresponding similarity data is detected successively from the reference block at position coordinates (0,0), thus finding the position m of the target block when the maximum similarity value is obtained (S20 and S22). Next, the result evaluation portion 66 performs screening by evaluating whether or not the detection result is adequate (S24). The processes in S22 and S24 are repeated for all the reference blocks (N of S26 and S28). Then, when the processes are complete for all the reference blocks (Y of S26), the depth image generation portion 68 finds the parallax from the position m and calculates a position z in the depth direction for the reference blocks for which a valid detection result was obtained as a result of screening (S30). This value is associated with the position coordinates (x,y) of the reference block, thus generating a depth image.

The processes from S12 to S30 are repeated for the next time step unless the processes of the information processor 10 for which position information of the subject is necessary are terminated (N of S32 and S34). All the processes are terminated when position information of the subject is no longer necessary as when the user terminates the game (Y of S32). It should be noted that the smoothing in the direction of time in S16 or the smoothing in the direction of space in S18 may be omitted as described above depending on the image characteristics, the processing capability of the information processor 10, necessary position identification accuracy, and so on.

Figure 15:
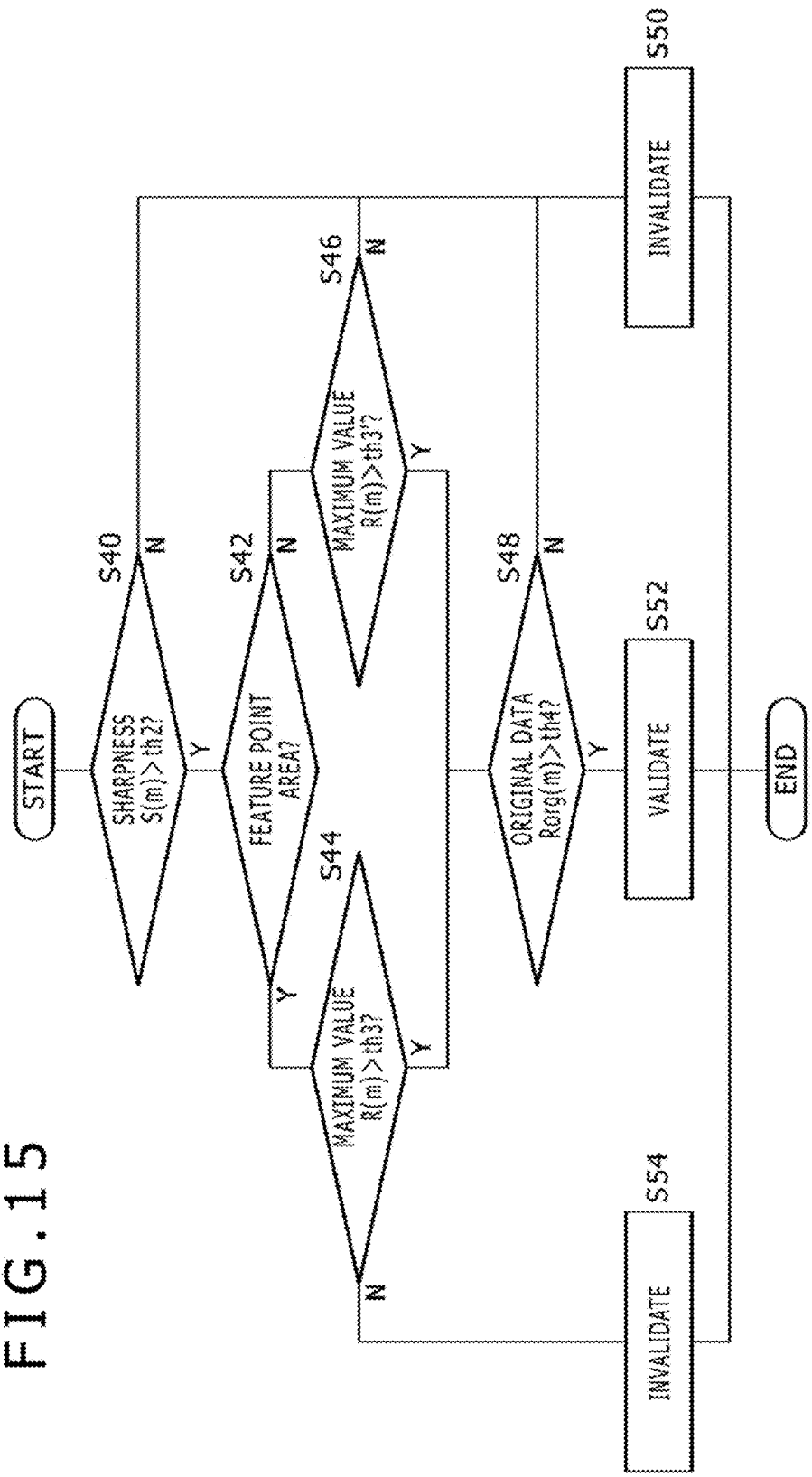
FIG. 15 is a flowchart illustrating processing steps for the result evaluation portion to screen a matching result in S24 of FIG. 14.

FIG. 15 is a flowchart illustrating processing steps for the result evaluation portion 66 to screen a matching result in S24 of FIG. 14. First, the sharpness of similarity is evaluated as a first evaluation item. More specifically, the result evaluation portion 66 compares the sharpness S(m) at the position m when the similarity is maximum against the threshold th2 specified for the sharpness (S40). When the sharpness S(m) is greater than the threshold th2, that is, when the maximum value stands out from the similarity in the surrounding areas, it is determined that the evaluation criterion is met, and control proceeds to the next evaluation item (Y of S40). If the sharpness S(m) is equal to the threshold th2 or less (N of S40), that is, if similarity data is gently sloping to a peak as shown in FIG. 7, it is determined that the evaluation criteria is not met, and information of the position m is invalidated (S50). In this case, the invalid value is associated with the corresponding reference block, thus preventing the subsequent processes from being performed. The same is true for the invalidation process which will be described below.

The maximum similarity value is evaluated as a next evaluation item. More specifically, the result evaluation portion 66 checks the standard deviation of the luminance of a reference block against the threshold, thus determining whether or not the picture represented by the reference block in question is a feature point area (S42). Here, the value found during calculation of similarity data in S14 of FIG. 14 can be used as the standard deviation of the luminance as described above. Therefore, the similarity data generation portion 62 stores, in the image storage section 48, not only similarity data but also the standard deviation of the luminance calculated in the calculation process of the similarity data in association with the position coordinates of the reference block.

When the reference block to be processed is a feature point area (Y of S42), the result evaluation portion 66 compares the maximum value R(m) of similarity against the preset threshold th3 (S44). If the reference block to be processed is not a feature point area (N of S42), the result evaluation portion 66 compares the maximum similarity value R(m) against a threshold th3' which is different from the preset threshold th3 (S46). Typically, if the reference block is not a feature point area, the reliability of the position m having the maximum value is low. Therefore, the threshold th3' is set larger than the threshold th3 to ensure that only the cases in which a higher maximum value is obtained are kept as results.

In any case, when the maximum similarity value R(m) is greater than the threshold th3 or th3', it is determined that the evaluation criterion is met, and control proceeds to the next evaluation item (Y of S44 or Y of S46). If the maximum similarity value R(m) is equal to the threshold or less, information of the position m is invalidated assuming that it is unreliable despite being maximum (S50 or S54).

The similarity in the direction of space before smoothing is verified as a next evaluation item. More specifically, of the similarity data before smoothing, similarity Rorg(m) at the position m where similarity after smoothing is maximum is compared against the preset threshold th4 (S48). If the similarity Rorg(m) before smoothing is equal to the threshold th4 or less (N of S48), it is determined that a false maximum was detected, and information of the position m is invalidated (S50). When the similarity Rorg(m) is greater than the threshold th4 (Y of S48), it is determined that the evaluation criterion is met, and information of the position m is validated (S52). As a result of the above processes, only information of the position m that has met all the evaluation criteria is validated and used for the subsequent processes.

It should be noted that the similarity before smoothing is verified only when smoothing is performed in the direction of space in S18 of FIG. 14. Further, the order of the three evaluation items may be changed, and any of the items may be omitted. The evaluation items to be evaluated, the order in which they are evaluated, and the thresholds to be used are determined as appropriate on the basis of the image characteristics, the processing capability of the information processor 10, necessary position identification accuracy, and so on. Further, optimal conditions may be determined experimentally from the viewpoint of specific accuracy of position information and processing efficiency using a shot image having an anticipated composition.

Figure 16:
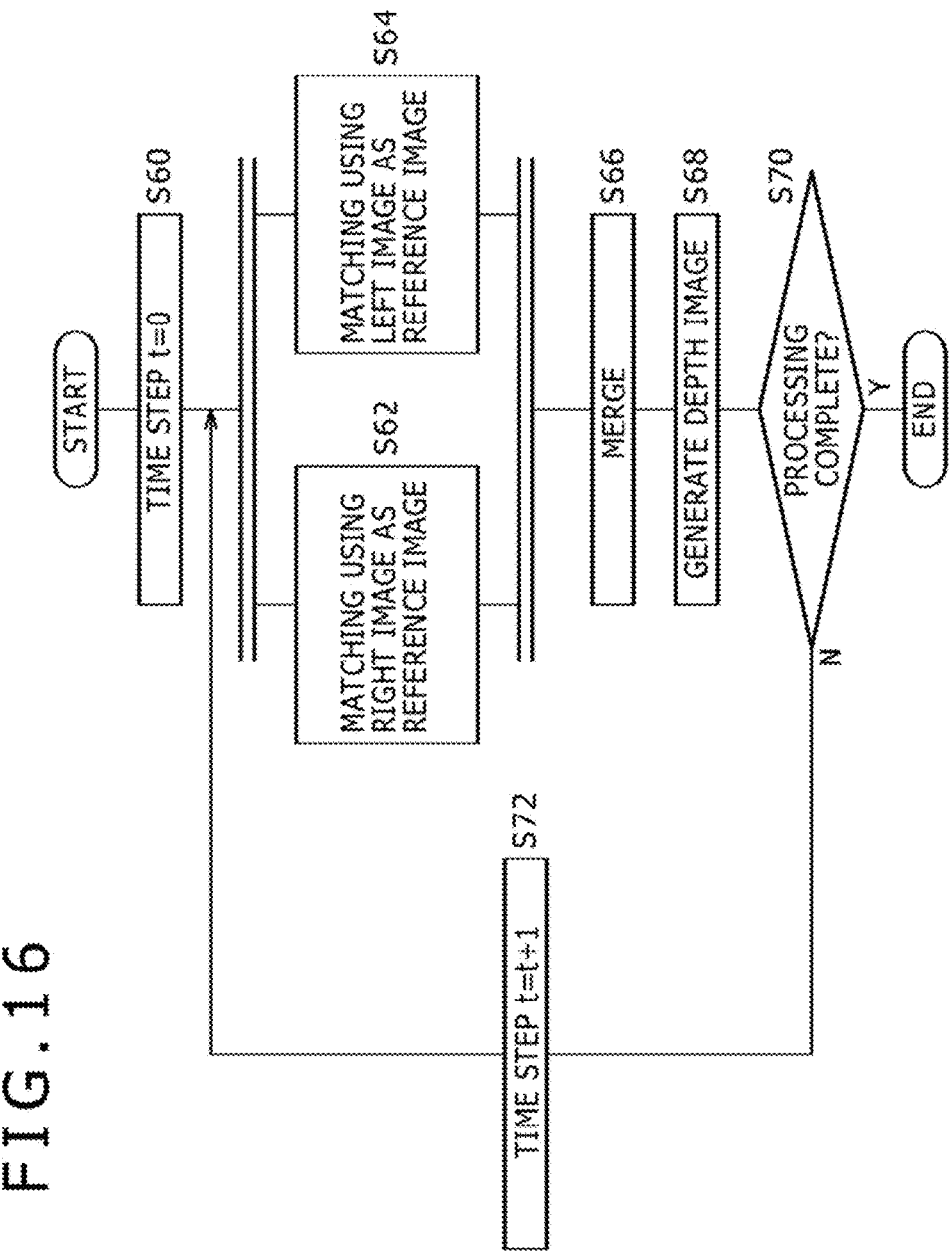
FIG. 16 is a flowchart illustrating processing steps for the position information generation section of the information processor to generate position information of a subject by performing matching using both stereo images as reference images.

In the flowchart illustrated in FIG. 14, one of the stereo images is used as a reference image, and then a reference block is set up in the reference image, followed by the detection of a target block that is highly similar to the reference block from the other image. This process may be performed twice, with the roles of the images switched so as to generate more reliable position information. FIG. 16 is a flowchart illustrating processing steps for the position information generation section 46 of the information processor 10 to generate position information of a subject by performing matching using both of the stereo images as reference images.

At the first time step t=0 (S60), mainly the similarity data generation portion 62, the similarity correction portion 64, and the result evaluation portion 66 of the position information generation section 46 perform the processes from S14 to S28 of FIG. 14 using the right image of the stereo images as a reference image (S62). In parallel with this, the position information generation section 46 performs the processes from S14 to S28 of FIG. 14 using the left image of the stereo images as a reference image (S64).

Next, the depth image generation portion 68 of the position information generation section 46 merges the parallax image based on the matching result using the right image as a reference image (hereinafter referred to as the "right parallax image") and the parallax image based on the matching result using the left image as a reference image (hereinafter referred to as the "left parallax image") (S66). Here, the parallax image refers to data representing parallax values as pixel values on the image plane. Parallax can be obtained on a reference block-by-reference block basis according to the matching result. Therefore, the pixels of the parallax image are associated with the reference blocks.

Block matching is basically designed to compare two shot images and should normally provide the same parallax images irrespective of which of the two stereo images is used as a reference image. On the other hand, if the pixels at the same position of the two parallax images have different values, at least one of the two values is probably unreliable. For this reason, the larger of the two parallax values found as a result of comparison is invalidated in the merging of S66. More specifically, for example, the difference between the value of each pixel of the right parallax image and that of the corresponding pixel of the left parallax image is calculated. If the difference is greater than a given threshold, the parallax value of the right parallax image is invalidated.

Parallax similar to that of the original stereo images is present in the two parallax images themselves. Therefore, the corresponding pixel of the left parallax image is located at a position displaced to the right by the pixel value of the right parallax image. It should be noted that, in addition to simply checking the difference between the values of the corresponding pixels against a threshold, the difference from not only the value of the corresponding pixel but also those of the surrounding pixels of the left parallax image may be calculated to check the sum thereof against a threshold. Alternatively, the difference from the mean value of a plurality of pixel values including those of the surrounding pixels may be checked against a threshold. This contributes to reduced likelihood of invalidation of data even in the event of an accidentally large difference due, for example, to noise in the corresponding pixel.

After invalidating such unreliable values of the right parallax image through merging, the depth image generation portion 68 generates a depth image using the right parallax image (S68). The processes from S62 to S68 are repeated for the next time step unless the processes of the information processor 10 for which position information of the subject is necessary are terminated (N of S70 and S72). The processes are terminated when position information of the subject is no longer necessary as when the user terminates the game (Y of S70).

Figure 17:
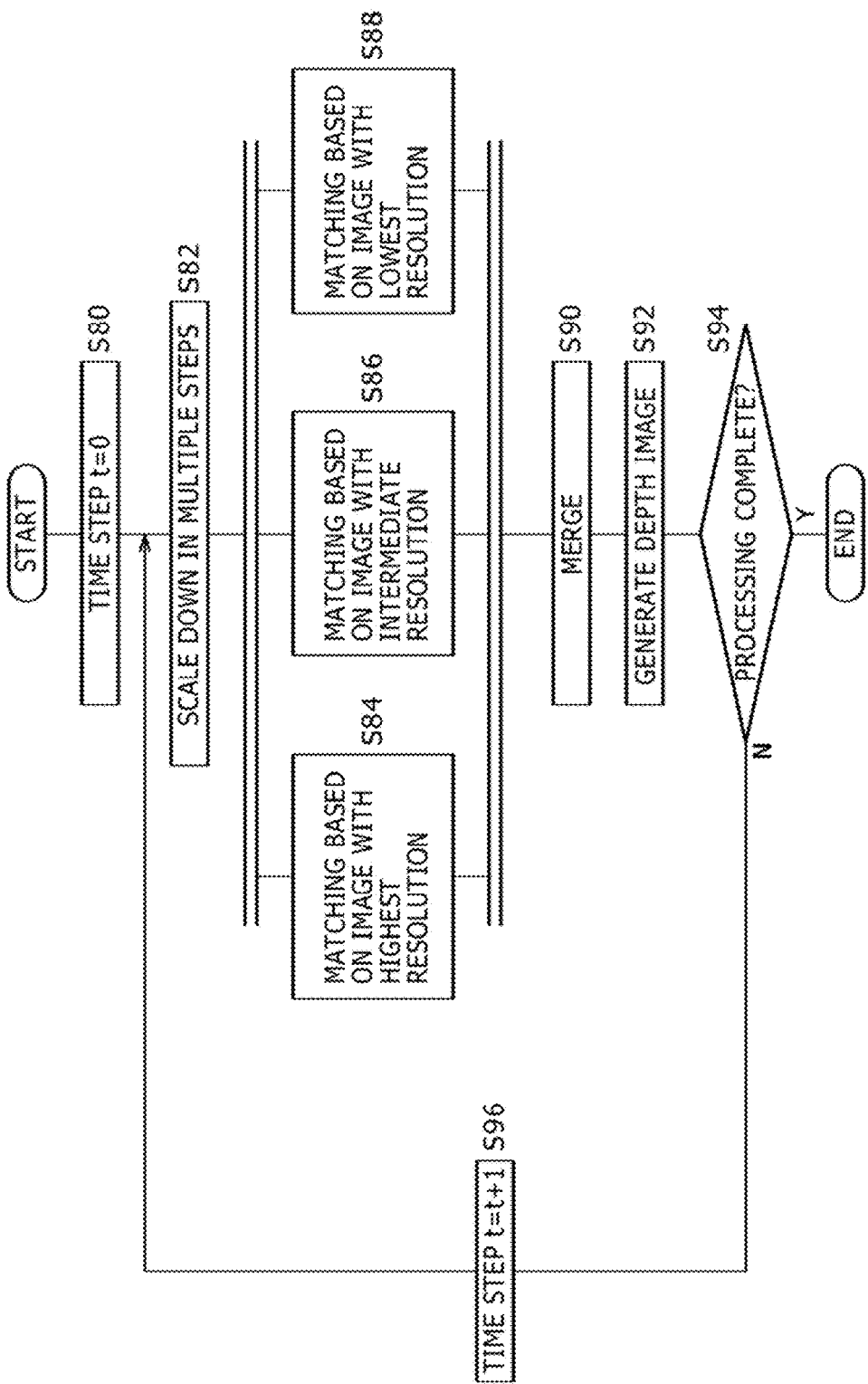
FIG. 17 is a flowchart illustrating processing steps for the position information generation section of the information processor to generate position information of a subject by performing matching of each of stereo images with a plurality of resolutions.

In the processes illustrated in FIG. 16, reliability is evaluated again by merging two parallax images obtained by switching the reference images between the stereo images, thus keeping only more reliable data. On the other hand, another option would be to merge parallax images obtained from stereo images with a plurality of resolutions. FIG. 17 is a flowchart illustrating processing steps for the position information generation section 46 of the information processor 10 to generate position information of a subject by performing matching of each of stereo images with a plurality of resolutions.

At the first time step t=0 (S80), the preprocessing portion 60 of the position information generation section 46 scales down each of the acquired stereo images in multiple steps, thus generating stereo images with a plurality of resolutions (S82). For example, assuming that the stereo images are scaled down in two steps, the stereo images with the highest resolution, i.e., the original shot images, the stereo images with an intermediate resolution, and the stereo images with the lowest resolution, are generated. It should be noted, however, that the number of steps in which the stereo images are scaled down is not limited thereto. Further, the scaling-down of the stereo images may be handled by the imaging device 12, and the information processor 10 may only acquire data resulting therefrom. Then, mainly the similarity data generation portion 62, the similarity correction portion 64, and the result evaluation portion 66 of the position information generation section 46 perform the processes from S14 to S28 of FIG. 14 (S84, S86, and S88).

Next, the position information generation section 46 merges the parallax images with a plurality of resolutions based on the matching result of the images with a plurality of resolutions (S90). It should be noted that the right and left parallax images with each resolution may be merged as illustrated in FIG. 16 before the merging of the parallax images between different resolutions. When the position of a subject in the depth direction is identified through stereo matching, the proper range of image resolution for processing varies depending on the position.

For example, the closer the subject to the camera, the larger the picture or parallax thereof. Therefore, the higher the resolution of the image, the larger the search range for block matching, and the smaller the comparison range, thus making it more likely for error to occur. The farther the subject is from the camera, the smaller the parallax. Therefore, the lower the resolution of the image, the more difficult it is to achieve the resolution for identifying that parallax.

For this reason, parallax images are generated by using stereo images with a plurality of resolutions, followed by merging of these images, thus compensating for data that has been invalidated in the previous processes for replacement with more accurate data. More specifically, if a pixel of the parallax image with the highest resolution has no value (invalid data is associated with this pixel), data at the corresponding position of the parallax image with the intermediate resolution is substituted into this pixel if available. If no pixel value is available even from the parallax image with the intermediate resolution, data at the corresponding position of the parallax image with the lowest resolution is substituted into this pixel if available. This makes it possible to identify the position of a subject close to the camera with high accuracy, a task prone to error in an image with high resolution.

Further, if the parallax of an area of the parallax image with the lowest resolution represented by a pixel value is greater than the given threshold, the pixel value of the corresponding area of the parallax image with the highest resolution may be overwritten with the above pixel value. This contributes to improved reliability of the parallax image with the highest resolution by using the data with the lowest resolution that is highly likely to have obtained the parallax of the subject close to the camera with high accuracy. When the parallax image with the highest resolution is complete as a result of such merging, the depth image generation portion 68 generates a depth image using the parallax image (S92). The processes from S82 to S92 are repeated for the next time step unless the processes of the information processor 10 for which position information of the subject is necessary are terminated (N of S94 and S96). The processes are terminated when position information of the subject is no longer necessary as when the user terminates the game (Y of S94).

FIG. 18 is a diagram that compares a depth image obtained in the present embodiment against that obtained in related art. First, the inside of a room with a person in the center is a subject in a shot image 202. It is clear that a depth image 206 generated by the present embodiment has significantly less noise and fewer data dropouts in the area representing the picture of the person as compared to a depth image 204 generated in related art. It is obvious that using the depth image 206 allows for more accurate processing of games and other information and modification of a shot image in accordance with human motion and position.

In the present embodiment described above, the parallax is found through block matching of stereo images, and the similarity between each of reference blocks and a target block is corrected and evaluated using a stereo matching technique adapted to identify the position of a subject in the depth direction. More specifically, similarity data, a similarity sequence of each reference block for a search range, is smoothed in the direction of time. This makes it possible to detect accidental high similarity due, for example, to noise, thus preventing such a case from being included in the matching result. Further, similarity data is smoothed in the direction of space. This ensures that a real maximum value is more readily highlighted, thus providing reduced possibility that such a real maximum value may be invalidated in subsequent evaluation. Further, it is possible to minimize accidentally high false peaks, thus preventing such peaks from being included in the matching result.

Still further, the maximum similarity value is determined as unreliable and invalidated if the extent to which such a maximum similarity value stands out is equal to a threshold or less. This makes it possible to exclude, from the matching result, accidental maximum values when similarity is high at any position of the search range due, for example, to successive presence of similar textures in the horizontal direction. Further, the maximum similarity value is determined as not representing high similarity and invalidated if it is equal to a given threshold or less. At this time, different thresholds are used between two cases, one in which there are many feature points in the reference block and another in which there are only a few feature points, thus adjusting the probability of invalidation. This not only prevents excessive invalidation of highly reliable data with many feature points but also excludes unreliable data from the matching result.

Still further, in the case of smoothing in the direction of space, even the maximum similarity value is determined as a false peak and invalidated if the similarity of the corresponding position in the similarity data before smoothing is equal to a given threshold or less. Alternatively, in this case, the maximum value in the original similarity data may be included in the matching result as a real maximum value. As described above, by correcting and evaluating similarity itself, it is possible to constantly minimize the occurrence of noise and areas with undefined positions in a finally acquired depth image. This makes it possible to generate a high-quality depth image that is robust to shooting environments such as room brightness, subject shape, arrangement, and so on.

The present disclosure has been described according to the embodiment. It is to be understood by those skilled in the art that the above embodiment is illustrative, that the present disclosure can be modified in various ways by combining the components and processes thereof, and that these modifications also fall within the scope of the present disclosure.

The present disclosure contains subject matter related to that disclosed in Japanese Priority Patent Application JP 2014-163965 filed in the Japan Patent Office on Aug. 11, 2014, the entire content of which is hereby incorporated by reference.

What is claimed is:

1. An information processor comprising:
an image acquisition section enabled to receive image data from an imaging device equipped with stereo cameras for shooting the same space from left and right viewpoints;
a position information generation section adapted to generate subject position information on the basis of images of a subject shot by the stereo-camera imaging device, the position information generation section including:
a similarity data generation portion adapted to treat, as a reference block, each of a plurality of reference-image areas obtained by dividing one of either left or right shot images shot with the imaging-device stereo cameras, to set up, for each of the reference blocks in the one of the either left or right shot images, a search-range image area in the other of the either left or right shot images, and to generate similarity data representing by-position similarity of the search-range image area to the reference-image area, calculated in association with position within the search range;
a result evaluation portion adapted to detect in the similarity data on a per-piece basis a position with a maximum similarity value and screen the detection result as either validated or invalidated, by making a given evaluation of the similarity;
a depth image generation portion adapted to find a parallax for each of the reference blocks using the detection results validated as a result of the screening by the result evaluation portion, calculate a position of a subject on a basis of the parallax, and generate a depth image that represents the position of the subject in the depth direction as pixel values; and
an output information generation section adapted to perform given information processing on a basis of the subject position in a three-dimensional space using the depth image and output the result of information processing.

2. The information processor of claim 1, wherein the result evaluation portion finds, by using a given calculation formula, sharpness that represents an extent to which the maximum similarity value stands out in the similarity data, and invalidates the detection result if the sharpness is equal to a given threshold or less.

3. The information processor of claim 1, wherein the result evaluation portion invalidates the detection result if the maximum similarity value of the similarity data is equal to a given threshold or less.

4. The information processor of claim 3, wherein the result evaluation portion classifies the reference blocks on a basis of whether or not each is a feature point area with many feature points, and uses a different threshold for the maximum similarity value depending on whether or not the reference block is a feature point area.

5. The information processor of claim 1, wherein:
the shot images are movie frames shot at a given frame rate;
the information processor further comprises a similarity correction portion adapted to compare the similarity data, generated by the similarity data generation portion for a reference block in the shot image of a first frame, with similarity data for an identical-position reference block in the shot image of a second frame immediately previous to the first frame and to time-directionally smooth the similarity data on the basis of comparing the similarity data for the reference blocks in the first and second frames; and
the result evaluation portion performs processes using the similarity data that has been time-directionally smoothed.

6. The information processor of claim 1, further comprising:
a similarity correction portion adapted to average similarity data generated by the similarity data generation portion together with similarity data generated for a given number of the reference blocks surrounding the corresponding reference block so as to smooth the similarity data in a direction of space, wherein
the result evaluation portion performs processes using the similarity data that has been smoothed in the direction of space.

7. The information processor of claim 1, wherein
the similarity data generation portion generates similarity data not only for reference blocks obtained by dividing one of the left and right shot images but also for reference blocks obtained by dividing the other image, and
the depth image generation portion generates left and right parallax images by finding the parallax in association with each of the reference blocks for each of the images in which the reference blocks have been set up and screens parallax data used to generate a depth image on a basis of a result of comparison of a parallax values at the corresponding positions of the left and right parallax images.

8. An information processing method comprising:
receiving image data from an imaging device equipped with stereo cameras for shooting the same space from left and right viewpoints;
treating, as a reference block, each of a plurality of reference-image areas obtained by dividing one of either left or right shot images shot with the imaging-device stereo cameras, setting up, for each of the reference blocks in the one of the either left or right shot images, a search-range image area in the other of the either left or right shot images, generating similarity data representing by-position similarity of the search-range image area to the reference-image area, calculated in association with position within the search range, and storing the similarity data in a memory;
reading the similarity data on a per-piece basis from the memory, detecting piece-by-piece in the similarity data a position with a maximum similarity value, and screening the detection result as either validated or invalidated, by making a given evaluation of the similarity;
finding a parallax for each of the reference blocks using the detection results validated as a result of the screening, calculating a position of a subject on a basis of the parallax, and generating a depth image that represents the position of the subject in the depth direction as pixel values; and
performing given information processing on a basis of the subject position in a three-dimensional space using the depth image and outputting the result of the information processing to an external device.

9. A non-transitory computer-readable recording medium having embodied thereon a computer program causing an information processor to execute steps of:
receiving image data from an imaging device equipped with stereo cameras for shooting the same space from left and right viewpoints;
treating, as a reference block, each of a plurality of reference-image areas obtained by dividing one of either left or right shot images shot with the imaging-device stereo cameras, setting up, for each of the reference blocks in the one of the either left or right shot images, a search-range image area in the other of the either left or right shot images, and generating similarity data representing by-position similarity of the search-range image area to the reference-image area, calculated in association with position within the search range;
detecting in the similarity data on a per-piece basis a position with a maximum similarity value and screening the detection result as either validated or invalidated, by making a given evaluation of the similarity;
finding a parallax for each of the reference blocks using the detection results validated as a result of the screening, calculating a position of a subject on a basis of the parallax, and generating a depth image that represents the position of the subject in the depth direction as pixel values; and
performing given information processing on a basis of the subject position in a three-dimensional space using the depth image and outputting the result of the information processing.

* * * * *